United States Patent
Hayashi et al.

(10) Patent No.: US 6,718,621 B1
(45) Date of Patent: Apr. 13, 2004

(54) MAGNETORESISTIVE HEAD PRODUCTION METHOD

(75) Inventors: Kazuhiko Hayashi, Tokyo (JP); Keishi Ohashi, Tokyo (JP); Nobuyuki Ishiwata, Tokyo (JP); Masafumi Nakada, Tokyo (JP); Eizo Fukami, Tokyo (JP); Kiyokazu Nagahara, Tokyo (JP); Hiroaki Honjo, Tokyo (JP); Shinsaku Saitoh, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/566,971

(22) Filed: May 9, 2000

(30) Foreign Application Priority Data

May 11, 1999 (JP) .......................................... 11-129684
Sep. 27, 1999 (JP) .......................................... 11-272516

(51) Int. Cl.$^7$ .......................... G11B 5/127; H04R 31/00
(52) U.S. Cl. .............................. 29/603.08; 29/603.09; 29/603.12; 29/603.15; 29/603.16; 360/66; 360/113
(58) Field of Search ............................. 29/593, 603.08, 29/603.09, 603.1, 603.12, 603.15, 603.16; 324/252; 360/66, 113

(56) References Cited

U.S. PATENT DOCUMENTS

| | | | | |
|---|---|---|---|---|
| 5,666,248 A | * | 9/1997 | Gill | 360/324.1 |
| 5,903,415 A | * | 5/1999 | Gill | 360/323 |
| 5,969,523 A | * | 10/1999 | Chung | 324/252 |
| 5,974,657 A | * | 11/1999 | Fox et al. | 29/603.08 |
| 6,084,405 A | * | 7/2000 | Suzuki | 324/252 |
| 6,256,178 B1 | * | 7/2001 | Gill | 360/324.2 |
| 6,445,527 B1 | * | 9/2002 | Cheng | 360/69 |

FOREIGN PATENT DOCUMENTS

| | | | | |
|---|---|---|---|---|
| JP | 61-77114 | | 4/1986 | G11B/5/39 |
| JP | 2-61572 | | 3/1990 | G01R/33/06 |
| JP | 4-358310 A | * | 12/1992 | |
| JP | 8-180334 A | * | 7/1996 | |
| JP | 9-91623 | | 4/1997 | G11B/5/39 |
| JP | 9-180130 | | 7/1997 | G11B/5/39 |
| JP | 9-223304 | | 8/1997 | G11B/5/39 |
| JP | 10-289417 | | 10/1998 | G11B/5/39 |
| JP | 11-45423 | | 2/1999 | G11B/5/60 |
| JP | 4-103014 | | 4/2000 | G11B/5/39 |

OTHER PUBLICATIONS

"Thin Film Magnetoresistors in Memory, Storage, and Related Applications" Thompson et al IEEE Transactions on Magnetics, vol. Mag–11; No. 4, Jul. 1975; pp. 1039–1050.

* cited by examiner

Primary Examiner—A. Dexter Tugbang
Assistant Examiner—Paul D Kim
(74) Attorney, Agent, or Firm—Hayes Soloway P.C.

(57) ABSTRACT

In a production process of an MR head using the tunnel junction film basically consisting of a free layer, a barrier layer, and a pinned layer, the resistance between the free layer and the pined layer reduced beforehand and increased afterward up to a resistance value necessary when actually used. While the resistance between the free layer and the pinned layer is low, current can easily flow, suppressing charge up, thus preventing insulation destruction of the barrier layer. This significantly increases a production yield of a recording/reproduction head using a ferromagnetic tunnel junction element.

12 Claims, 35 Drawing Sheets

LONGITUDINAL BIAS LAYER FORMATION AND LIFT OFF

STENCIL PR FORMATION

FORMATION OF LOWER SHIELD LAYER, LOWER GAP LAYER, AND LOWER ELECTRODE LAYER

FORMATION OF MTJ FILM AND FIRST UPPER ELECTRODE LAYER

PR FORMATION

MILLING
(DOWN TO THE BARRIER LAYER)

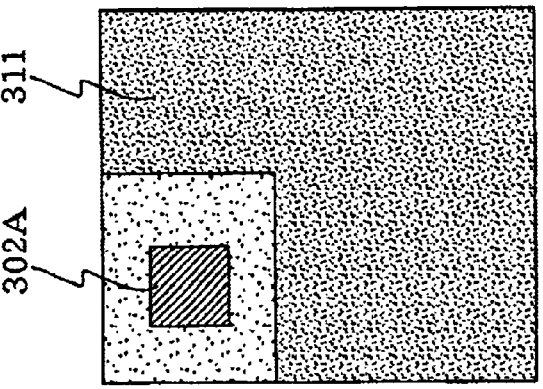
FIG. 17A INSULATION FILM FORMATION AND LIFT OFF
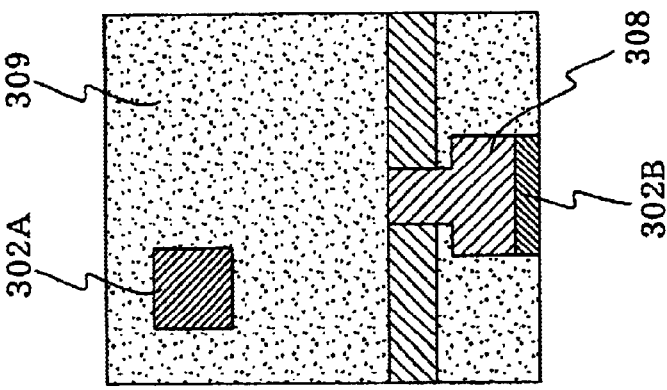
FIG. 17B HOLE FORMATION IN INSULATION LAYER AND BARRIER LAYER
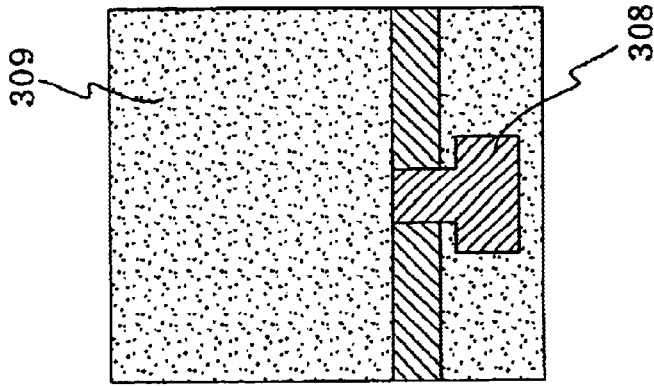
FIG. 17C FORMATION OF SECOND UPPER ELECTRODE LAYER, UPPER GAP LAYER, AND UPPER SHIELD LAYER

LAPPING

RECORDING HEAD PRODUCTION

HOLE FORMATION IN INSULATION LAYER AND BARRIER LAYER

MILLING
(TO BARRIER LAYER OR BELOW)

CONDUCTIVE LAYER

PR FORMATION

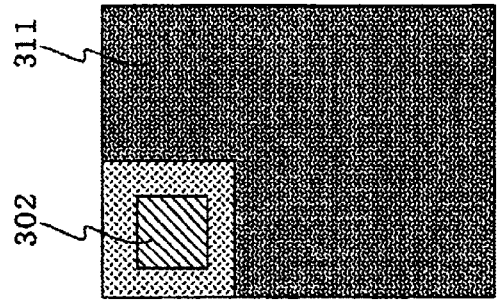
FIG. 20C LAPPING
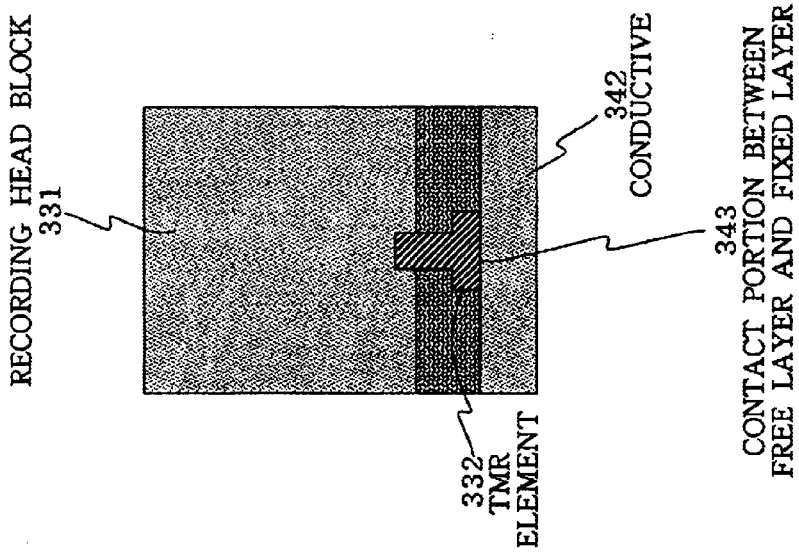
FIG. 20B RECORDING HEAD BLOCK PRODUCTION
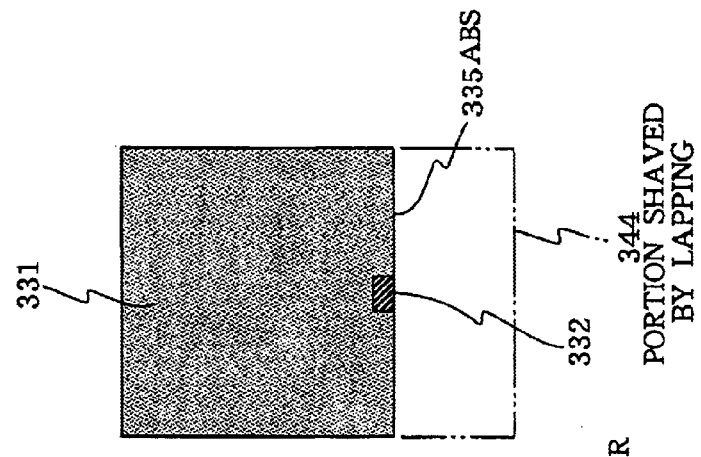
FIG. 20A FORMATION OF SECOND UPPER ELECTRODE LAYER, UPPER GAP LAYER, AND UPPER SHIELD LAYER

PR FORMATION

MILLING, INSULATION LAYER FORMATION, AND LIFT OFF

HOLE FORMATION IN INSULATION LAYER AND BARRIER LAYER

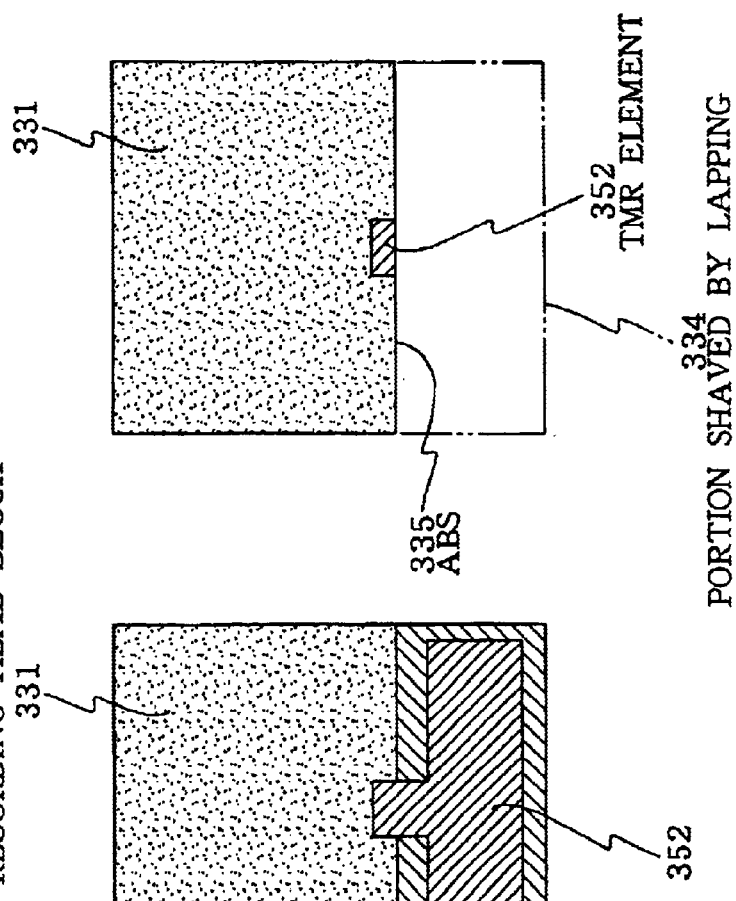
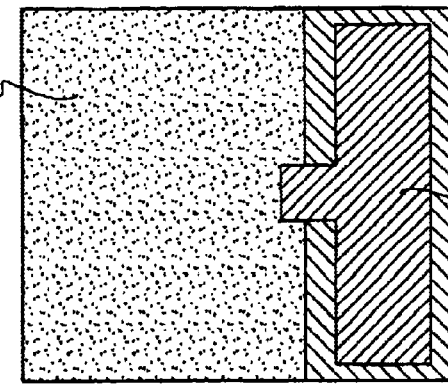
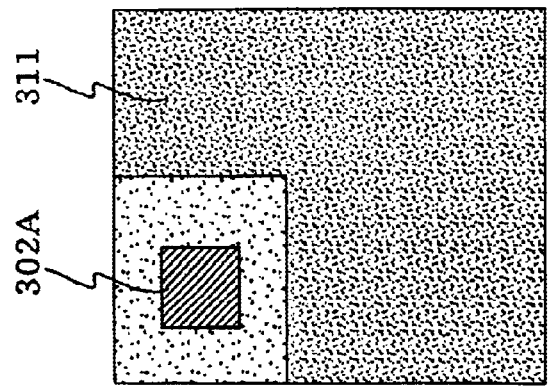

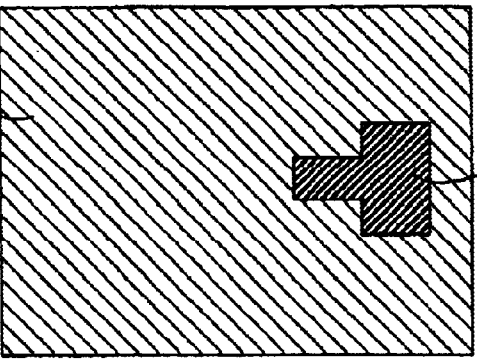
FIG.23C MILLING DOWN TO BARRIER LAYER
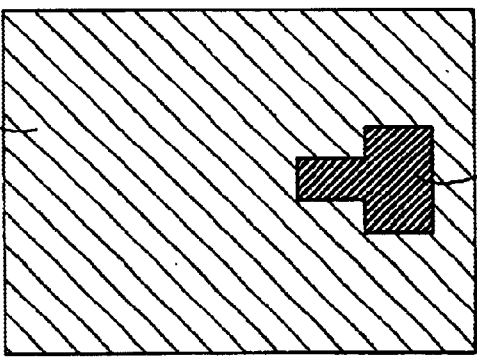
FIG.23B STENCIL PR FORMATION
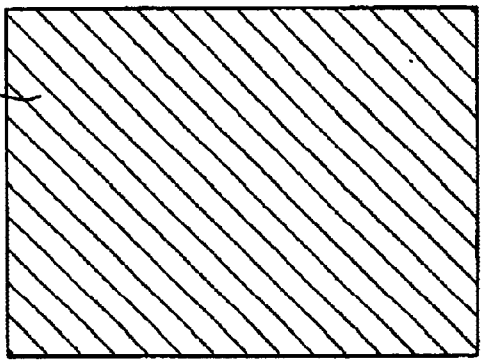
FIG.23A FORMATION OF LOWER SHIELD LAYER, LOWER ELECTRODE LAYER, LOWER GAP LAYER, AND MTJ FILM

MILLING AND PR REMOVAL

PR FORMATION

FORMATION OF INSULATION LAYER AND LONGITUDINAL BIAS LAYER, AND LIFT OFF

HOLE FORMATION IN INSULATION LAYER AND BARRIER LAYER

FORMATION OF UPPER ELECTRODE LAYER, UPPER GAP LAYER, AND UPPER SHIELD LAYER

RECORDING HEAD BLOCK PRODUCTION

531 RECORDING HEAD BLOCK
532 TMR ELEMENT
533 CONTACT PORTION BETWEEN UPPER AND LOWER ELECTRODE LAYERS

LAPPING 531
532
534 PORTION SHAVED BY LAPPING
535 ABS

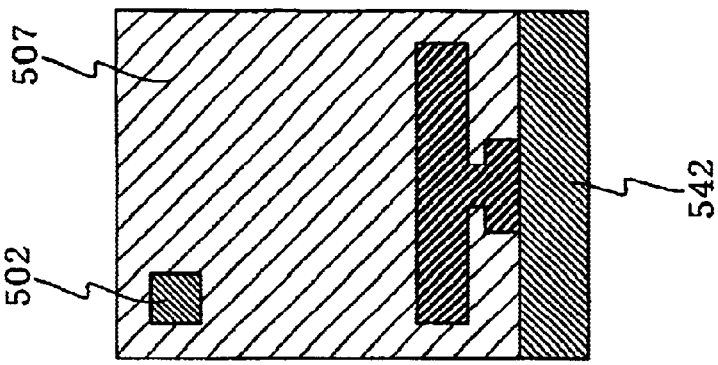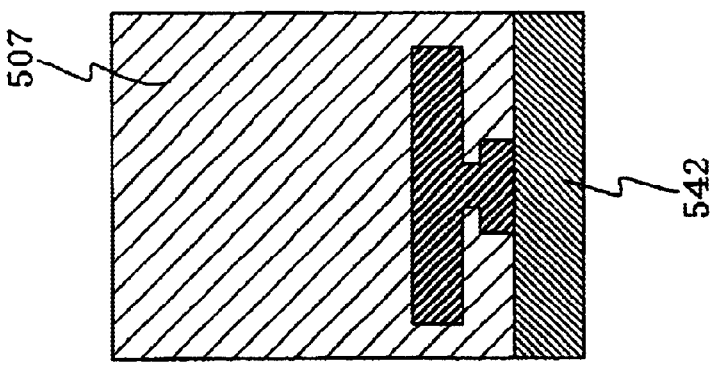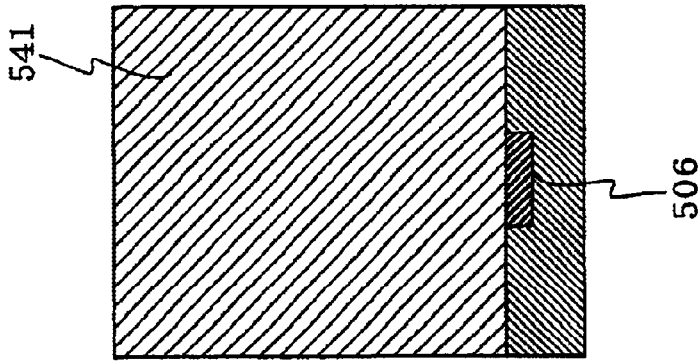

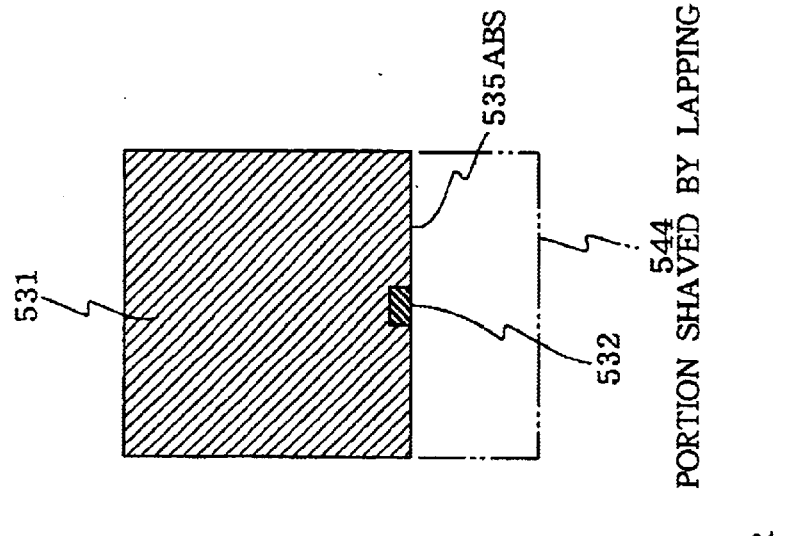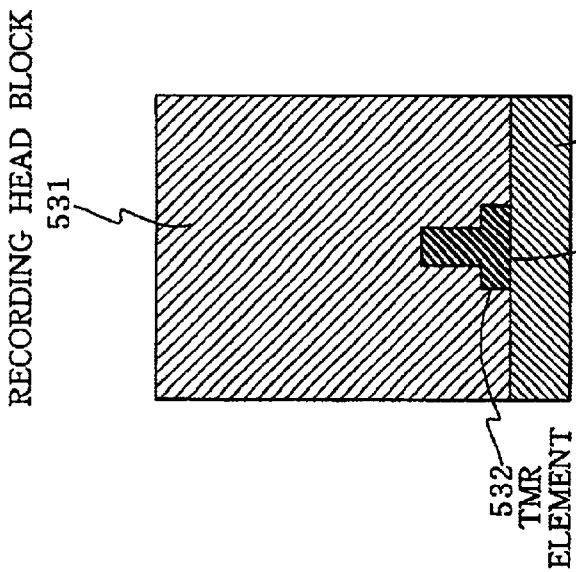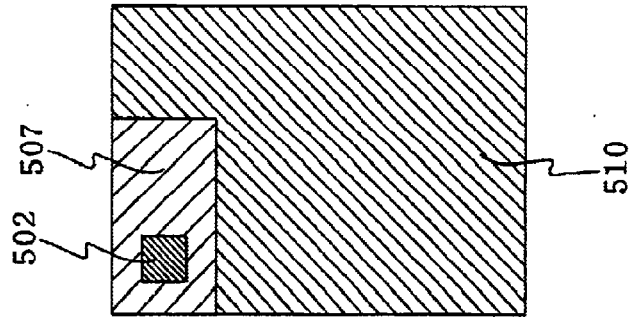

PR FORMATION

MILLING

FORMATION OF INSULATION LAYER AND LONGITUDINAL BIAS LAYER, AND LIFT OFF

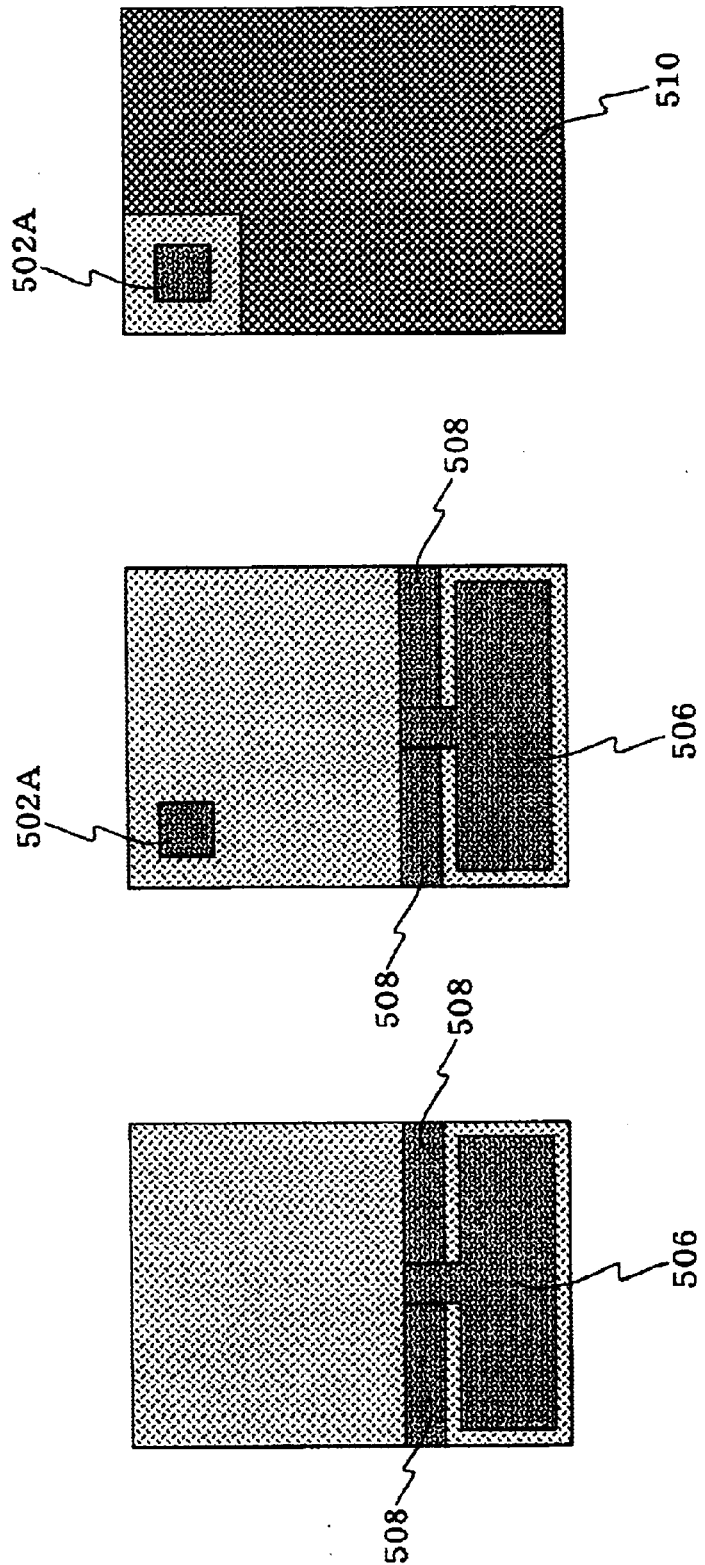

RECORDING HEAD BLOCK PRODUCTION

LAPPING

FIG. 33A  COMPARATIVE EXAMPLE 1

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 0 | 0.2 | 0.4 | 0.7 | 3.1 | 3.2 | 1.4 | 0.1 | 0.2 | 0 |

FIG. 33B  EXAMPLE 1

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 3.2 | 3.1 | 3.2 | 3.2 | 0.2 | 3.0 | 3.1 | 3.1 | 0 | 3.3 |

FIG. 33C  EXAMPLE 2

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 3.1 | 3.0 | 3.1 | 3.2 | 3.0 | 3.1 | 3.2 | 3.0 | 3.1 | 1.1 |

FIG. 34A COMPARATIVE EXAMPLE 2

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 0.2 | 0.1 | 3.1 | 0.2 | 0.2 | 3.1 | 3.3 | 0.7 | 0.2 | 0.4 |

FIG. 34B EXAMPLE 3

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 0.2 | 3.1 | 3.0 | 3.1 | 3.1 | 3.2 | 3.2 | 3.3 | 3.2 | 0.7 |

FIG. 34C EXAMPLE 4

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 3.2 | 3.1 | 3.0 | 3.1 | 1.2 | 3.0 | 3.1 | 3.1 | 3.2 | 3.2 |

*FIG.35A* COMPARATIVE EXAMPLE 3

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 0.5 | 0.3 | 0.4 | 3.2 | 0.7 | 3.3 | 3.2 | 0.7 | 1.8 | 0 |

*FIG.35B* EXAMPLE 5

| SAMPLE No. | 1 | 2 | 3 | 4 | 5 | 6 | 7 | 8 | 9 | 10 |
|---|---|---|---|---|---|---|---|---|---|---|
| REPRODUCTION OUTPUT (mV) | 1.3 | 3.3 | 0.1 | 3.2 | 3.3 | 3.1 | 3.2 | 1.7 | 3.1 | 3.2 |

MAGNETORESISTIVE HEAD PRODUCTION METHOD

BACKGROUND OF THE INVENTION

1. Field of the Invention

The present invention relates to a tunnel junction film consisting of a free layer, a barrier layer, and a pinned layer for reading an information signal from a magnetic recording medium and in particular, to a production method of a magnetoresistive head having a tunnel junction film.

2. Description of the Related Art

Conventionally, there has been disclosed a magnetic reading converter called a magnetoresistive (MR) sensor or head. It is known that the MR sensor or head can read data from a magnetic surface with a great linear density. The MR sensor detects a magnetic signal via 'a resistance change as a function of direction of magnetic flux intensity' which is detected by a reading element. Such a conventional MR sensor operates according to an anisotropic magnetic resistance (AMR) effect. The AMR effect is that a resistance component of a reading element changes in proportion of a square of cosine of the angle between a magnetization direction and the direction of a current detected. The AMR effect is detailed in D. A. Thompson "Memory, Storage, and Related Applications" IEEE Trans. on Mag. MAG-11, p. 1039 (1975). A magnetic head using the AMR effect normally applies a longitudinal bias so as to suppress the Barkhausen noise. This longitudinal bias is often applied using an anti-ferromagnetic material such as FeMn, NiMn, and nickel oxide.

Recently, there is a description on more remarkable magnetoresistivity based on a conductive electron spin dependent transfer between magnetic layers via a non-magnetic layer and an accompanying spin dependent scattering on the boundary plane. This magnetoresistivity is called by various names such as "giant magnetoresistivity" and "spin bulb effect". Such a magnetic sensor is made from an appropriate material and exhibits an improved sensitivity and greater resistance change than the sensor using AMR. In this type of MR sensor, within-plane resistance of ferromagnetic layers separated by a non-magnetic layer changes in proportion to cosine of the angle between the magnetization directions of the two layers.

Japanese Patent Publication No. 2-61572 discloses a layered magnetic structure bringing about a high MR change caused by anti-parallel arrangement of magnetization in the magnetic layers. In this Publication, as a material which can be used in the layered structure, there are exemplified ferromagnetic transition metals and alloys. Moreover, it is disclosed that one of at least two ferromagnetic layers separated by an intermediate layer is provided with a pinning layer, which is preferably made from FeMn.

Japanese Patent Publication No. 4-103014 discloses a ferromagnetic tunnel junction element having an intermediate layer inserted between ferromagnetic layers, to form a multi-layered film wherein a bias magnetic field from an anti-ferromagnetic layer is applied to at least one of the ferromagnetic layers, so as to constitute a ferromagnetic tunnel junction film.

A shield type MR head using the ferromagnetic tunnel junction film (MTJ film) basically consists of a free layer, a barrier layer, and a pinned layer. However, since a barrier layer is an insulation layer and the free layer and the pinned layer are metal layers, the combination of the free layer, the barrier layer, and the pinned layer serves like a capacitor, and electric charges are easily accumulated in the free layer and the pinned layer. For this, in a production procedure, if too much electric charge is accumulated in the free layer and the pinned layer, a great voltage is applied to both surfaces of the barrier layer and the barrier layer is often destroyed by discharge. The MTJ film shows a resistance change caused by polarization of the ferromagnetic layers at the both surfaces of the insulation layers. Accordingly, if the insulation destruction is caused and a current bypass is formed, almost no resistance change is generated in the MTJ film.

A recording/reproduction head using the MTJ film is produced according to a following procedure.

1) A lower shield is formed on a wafer.
2) A lower gap is formed.
3) A lower electrode is formed.
4) An MTJ film is formed.
5) A longitudinal bias is formed.
6) An upper electrode is formed.
7) An upper gap is formed.
8) A common pole is formed.
9) A yoke is formed.
10) A coil is formed.
11) An insulation layer is formed.
12) An upper pole is formed.
13) A terminal is formed.
14) An ABS is lapped.

Here, photoresist (PR) process is often used in formation of the lower shield, the lower gap, lower electrode, the MTJ film, the longitudinal bias, the upper electrode, the upper gap, the common pole, the yoke, the coil, the insulation layer, and the upper pole. In the PR process, baking is performed such as pre-bake, positive-negative reverse baking, post-baking, and the like. These processes are performed in a dry atmosphere of a high temperature. Accordingly, friction between the wafer and the air often causes static electricity. The static electricity after the MTJ film formation leads to the electrostatic destruction (ESD) of the barrier layer. Moreover, in the aforementioned production steps, milling is performed after PR formation. Ion generation during milling often charges up the free layer and the pinned layer of the MTJ film, causing electrostatic destruction of the barrier layer.

Thus, electric charge generated during the production of an MR head destroys the barrier layer of the MTJ film. Accordingly, when the aforementioned production steps are complete, the yield of the MR head is significantly reduced.

SUMMARY OF THE INVENTION

It is therefore an object of the present invention to provide a magnetoresistive (MR) head production method in which insulation destruction is prevented during the production of a barrier layer of the tunnel junction film, so that the production yield is improved.

The MR head production method according to the present invention is a method for producing an MR head having a tunnel junction film consisting of a free layer, a barrier layer, and a pinned layer, the method comprising: a first step of forming a resistance value between the free layer and the pinned layer smaller than a resistance value when used as the MR head; and a second step of increasing the resistance value formed in the first step, to a resistance value when used as the MR head.

In other words, in a production process of an MR head using the tunnel junction film basically consisting of a free layer, a barrier layer, and a pinned layer, the resistance between the free layer and the pinned layer is reduced beforehand and increased afterward up to a resistance value necessary when actually used. When the resistance between the free layer and the pinned layer is low, current flows easily and charge up is suppressed, thus preventing the insulation destruction of the barrier layer. And the resistance between the free layer and the pinned layer is increased afterward so as to serve as a reproduction head.

BRIEF DESCRIPTION OF THE DRAWINGS

FIG. 17 is a conceptual plan view of the first example of the production method of the MR head shown in FIG. 3, proceeding from FIG. 17A to FIG. 17C.

FIG. 20 is a conceptual plan view of the second example of the production method of the MR head shown in FIG. 3, proceeding from FIG. 20A to FIG. 20C.

FIG. 22 is a conceptual plan view of the third example of the production method of the MR head shown in FIG. 3, proceeding from FIG. 22A to FIG. 22C.

FIG. 23 is a conceptual plan view of a first example of a production method of the MR head shown in FIG. 5, proceeding from FIG. 23A to FIG. 23C.

FIG. 27 is a conceptual plan view of a second example of a production method of the MR head shown in FIG. 5, proceeding from FIG. 27A to FIG. 27C.

FIG. 28 is a conceptual plan view of the second example of the production method of the MR head shown in FIG. 5, proceeding from FIG. 28A to FIG. 28C.

FIG. 30 is a conceptual plan view of the third example of the production method of the MR head shown in FIG. 5, proceeding from FIG. 30A to FIG. 30C.

FIG. 33 shows reproduction outputs of MR heads. FIG. 33A shows a Comparative Example 1, FIG. 33B shows Example 1, and FIG. 33C shows Example 2.

FIG. 34 shows reproduction outputs of MR heads. FIG. 34A shows a Comparative Example 2, FIG. 34B shows Example 3, and FIG. 34C shows Example 4.

FIG. 35 shows reproduction outputs of MR heads. FIG. 35A shows a Comparative Example 3, and FIG. 35B shows Example 5.

DESCRIPTION OF THE PREFERRED EMBODIMENTS

Figure 1:
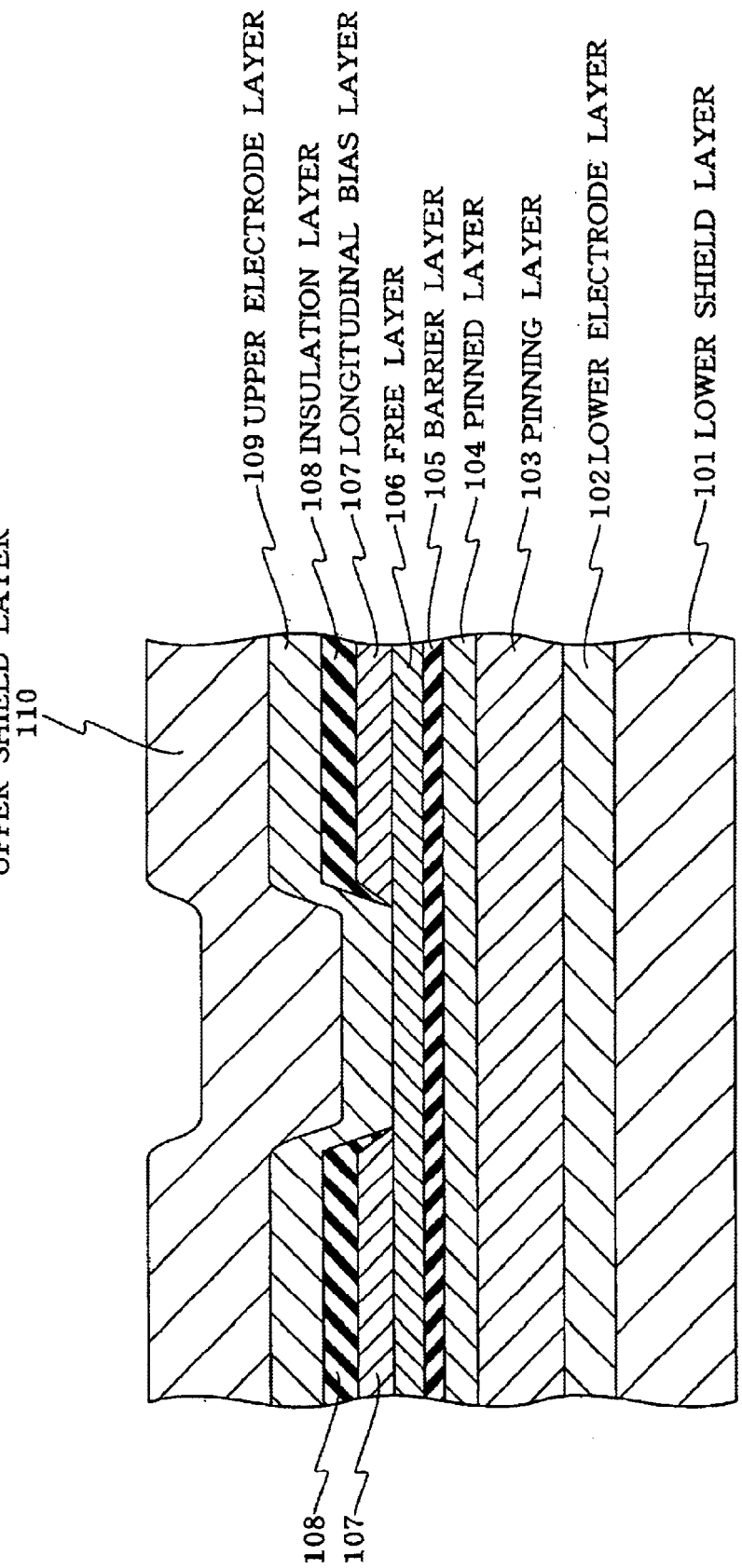
FIG. 1 is a conceptual cross sectional view of a first example of a magnetoresistive (MR) head according to the present invention cut off in parallel to the ABS.

FIG. 1 is a conceptual cross sectional view of a first example of a magnetoresistive (MR) head according to the present invention cut off in parallel to the ABS. This first example corresponds to claim 2. Hereinafter, explanation will be given with reference to this FIG. 1.

In this configuration, on a substrate (not depicted), a lower shield 101, a lower electrode layer 102, an undercoat layer (not depicted), a pinning layer 103, a pinned layer 104, a barrier layer 105, and a free layer 106 are successively formed. Thereon, a patterned longitudinal bias layer 107 and an insulation layer 108 are formed. Furthermore, thereon, an upper electrode layer 109 and an upper shield layer 110 are formed. The combination of the undercoat layer, the pinning layer 103, the pinned layer 104, the barrier layer 105, and the free layer 106 constitutes an MTJ film.

In this configuration, if a current is made to flow from the upper electrode layer 109 to the lower electrode layer 102, the current flows from the upper electrode layer 109 and passes through the portion sandwiched by the insulation layers 108, and then through the free layer 106, the barrier layer 105, the pinned layer 104, the pinning layer 103, the undercoat layer, reaching the lower electrode layer 102. Here, the longitudinal bias layer 107 is insulated from the current flow and does not affect the current flow. Moreover, since the longitudinal bias layer 107 is formed directly on the free layer 106, the longitudinal bias is sufficiently applied to the free layer 106. Accordingly, in this configuration, it is possible to simultaneously obtain that the sense current flows through the ferromagnetic tunnel junction as is necessary, and that the longitudinal bias is applied to the free layer as is necessary.

In the above-given explanation, the lower electrode layer 102 is formed on the lower shield layer 101, and the upper shield layer 110 is formed on the upper electrode layer 109. However, it is also possible to provide an insulation layer as a lower gap layer between the lower shield layer 101 and the lower electrode layer 102, or between the upper electrode layer 109 and the upper shield layer 110. Moreover, the lower shield layer 101 and the lower electrode layer 102 may be formed as a single common layer. Similarly, the upper electrode layer 109 and the upper shield layer may be formed as a single common layer. It is also possible to provide an undercoat layer between the anti-ferromagnetic layer (pinning layer 103) and the lower electrode layer 102, and to provide an overcoat layer between the free layer 106 and the upper electrode layer 109.

Figure 2:
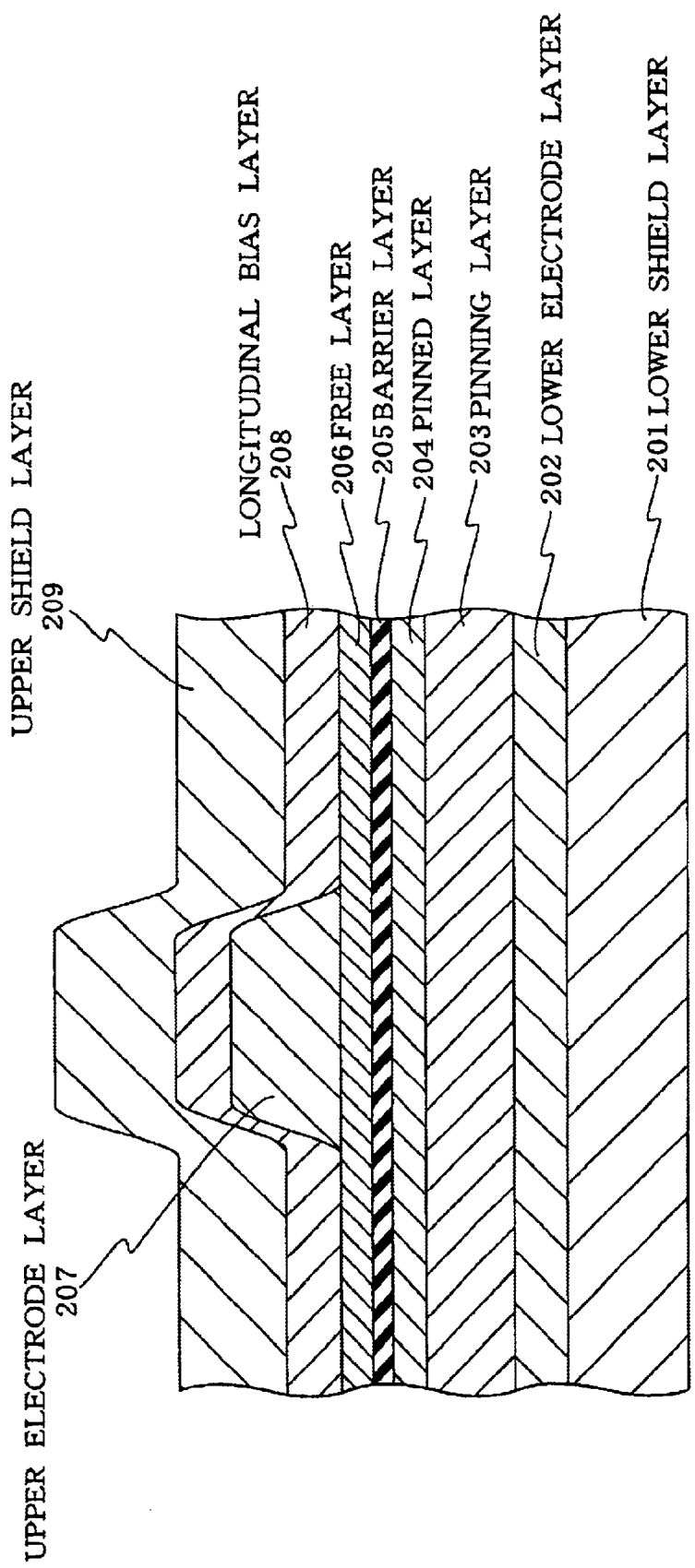
FIG. 2 is a conceptual cross sectional view of a second example of the MR head according to the present invention cut off in parallel to the ABS.

FIG. 2 is a conceptual cross sectional view of a second example of the MR head according to the present invention cut off in parallel to the ABS. This second example corresponds to claim 3. Hereinafter, explanation will be given with reference to this FIG. 2.

In this configuration, on a substrate (not depicted), a lower shield layer 201, a lower electrode layer 202, a pinning layer 203, a pinned layer 204, a barrier layer 205, and a free layer 206 are successively formed. Thereon, a patterned upper electrode layer 207 is formed. Furthermore, thereon, a longitudinal bias layer 208 and an upper shield layer 209 are formed. The combination of the pinning layer 203, the pinned layer 204, the barrier layer 205, and the free layer 206 constitutes an MTJ film.

In this configuration, if a current is made to flow from the upper electrode layer 207 to the lower electrode layer 202, the current flows from the upper electrode layer 207 and passes through the free layer 206, the barrier layer 205, the pinned layer 204, the pinning layer 203, reaching the lower electrode layer 202. Here, the longitudinal bias layer 208 does not affect the current flow. Moreover, since the longitudinal bias layer 208 is formed directly on the free layer 206, the longitudinal bias is sufficiently applied to the free layer 206. Accordingly, by using this configuration, it is possible to simultaneously obtain that the sense current flows through the ferromagnetic tunnel junction as is necessary and that the longitudinal bias is applied to the free layer 206 as is necessary.

In the above-given explanation, the lower electrode layer 202 is formed on the lower shield layer 201 and the upper shield layer 209 is formed on the upper electrode layer 207. However, it is also possible to provide an insulation layer as a lower gap layer between the lower shield layer 201 and the lower electrode layer 202, or between the upper electrode layer 207 and the upper shield layer 209. Moreover, the lower shield layer 201 and the lower electrode layer 202 may be formed as a single common layer. Similarly, the upper electrode layer 207 and the upper shield layer 209 may be formed as a single common layer. It is also possible to provide an undercoat layer between the anti-ferromagnetic layer (pinning layer 203) and the lower electrode layer 202 and to provide an overcoat layer between the free layer 206 and the upper electrode layer 207.

Figure 3:
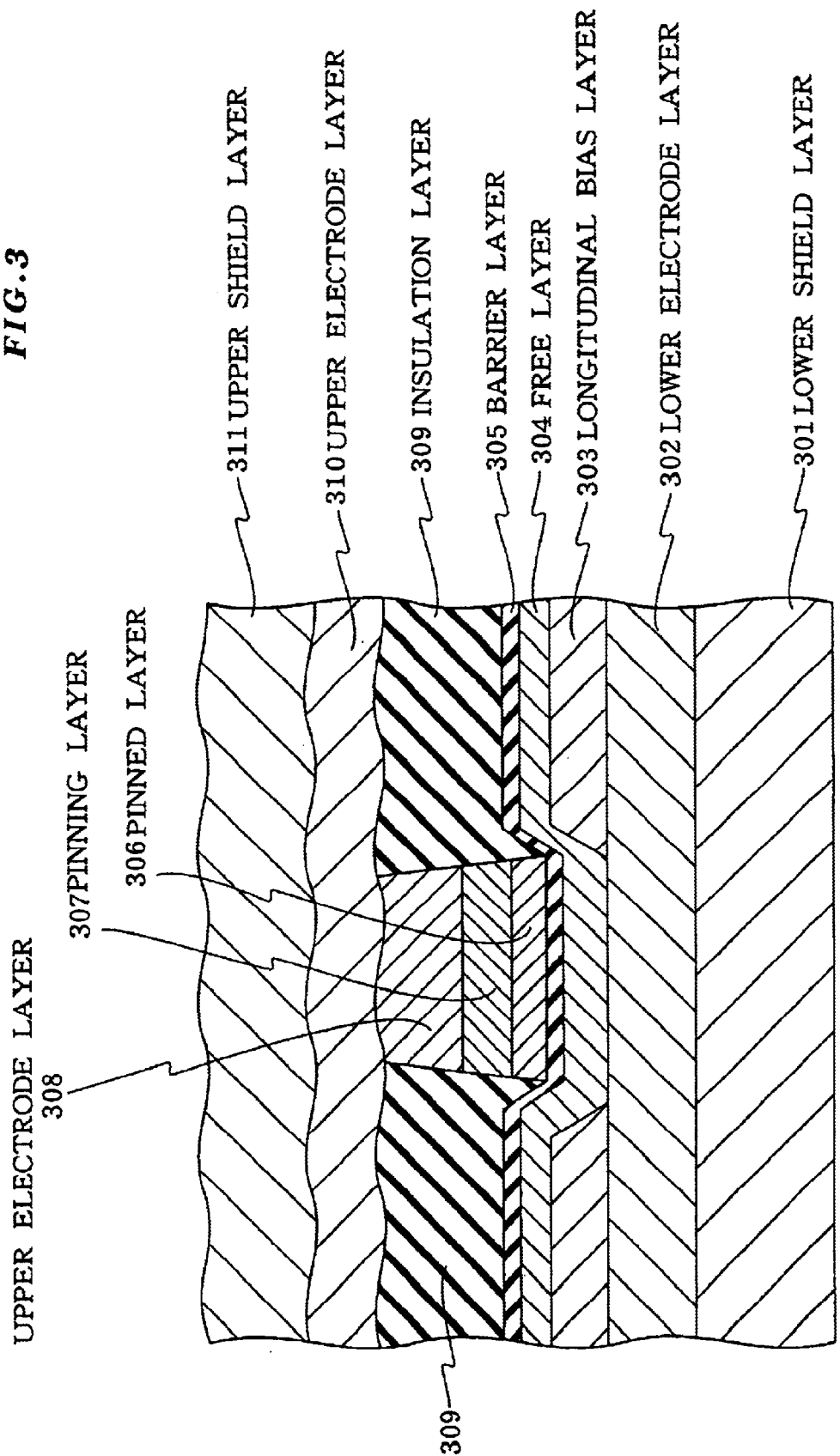
FIG. 3 is a conceptual cross sectional view of a third example of the MR head according to the present invention cut off in parallel to the ABS.

FIG. 3 is a conceptual cross sectional view of a third example of the MR head according to the present invention cut off in parallel to the ABS. This third example corresponds to claim 4. Hereinafter, explanation will be given with reference to this FIG. 3.

In this configuration, on a substrate (not depicted), a lower shield layer 301 and a lower electrode layer 302 are formed. Thereon, a free layer 304 and a barrier layer 305 are formed. On a portion of the barrier layer 305 sandwiched by right and left longitudinal bias layers 303, a pinned layer 306, a pinning layer 307, and an upper electrode layer 308 are formed while being patterned as shown in FIG. 3. The patterned pinned layer 306, the pinning layer 307, and the upper electrode layer 308 are sandwiched by an insulation layer 309. Furthermore, thereon, an upper electrode layer 310 and an upper shield layer 311 are formed. The combination of an undercoat layer (not depicted), the pinning layer 307, the pinned layer 306, the barrier layer 305, and the free layer 304 constitutes an MTJ film.

In this configuration, if a current is made to flow from the upper electrode layer 308 to the lower electrode layer 302, the current flows from the upper electrode layer 308 and passes through the pinning layer 307, the pinned layer 306, the barrier layer 305, and the free layer 304, reaching the lower electrode layer 302. Here, the longitudinal bias layer 303 does not affect the current flow. Moreover, since the free layer 304 is formed directly on the longitudinal bias layer 303, longitudinal bias is sufficiently applied to the free layer 304. Accordingly, by using this configuration, it is possible to simultaneously obtain that the sense current flows through the ferromagnetic tunnel junction as is necessary and that the longitudinal bias is applied to the free layer as is necessary.

In the above-given explanation, the lower electrode layer 302 is formed on the lower shield layer 301, and the upper shield layer 311 is formed on the upper electrode layer 310. However, it is also possible to provide an insulation layer as a lower gap layer between the lower shield layer 301 and the lower electrode layer 302 or between the upper electrode layer 310 and the upper shield layer 311. Moreover, the lower shield layer 301 and the lower electrode layer 302 may be formed as a single common layer, and similarly, the upper electrode layer 310 and the upper shield layer 311 may be formed as a single common layer. It is also possible to provide an undercoat layer between the lower electrode layer 302 and the free layer 304 and an overcoat layer between the anti-ferromagnetic layer (pinning layer 307) and the upper electrode layer 310.

Figure 4:
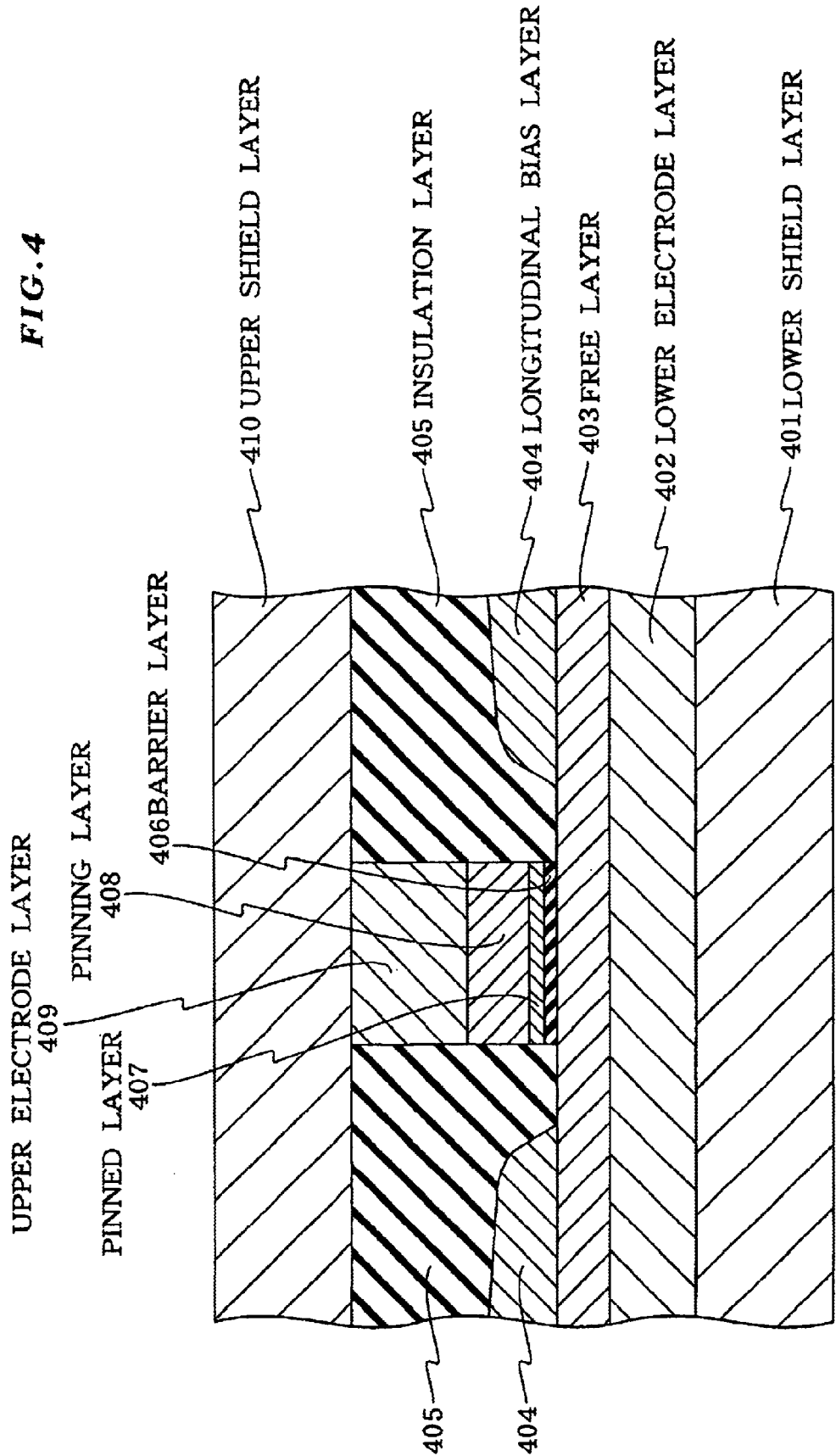
FIG. 4 is a conceptual cross sectional view of a fourth example of the MR head according to the present invention cut off in parallel to the ABS.

FIG. 4 is a conceptual cross sectional view of a fourth example of the MR head according to the present invention cut off in parallel to the ABS. This fourth example corresponds to claim 5. Hereinafter, explanation will be given with reference to this FIG. 4.

In this configuration, on a substrate (not depicted), a lower shield layer 401, a lower electrode layer 402, and a free layer 403 are formed. Thereon, a patterned longitudinal bias layer 404 is formed. On the free layer 403, between the right and left longitudinal bias layers 404, a barrier layer 406, a pinned layer 407, a pinning layer 408, an upper electrode layer 409 are formed while being patterned as shown in FIG. 4. The combination of an undercoat layer (not depicted), the pinning layer 408, the pinned layer 407, the barrier layer 406, and the free layer 403 constitutes an MTJ film.

In this configuration, if a current is made to flow from the upper electrode layer 409 to the lower electrode layer 402, the current flows from the upper electrode layer 409 and passes through the pinning layer 408, the pinned layer 407, the barrier layer 406, the free layer 403, reaching the lower electrode layer 402. Here, the longitudinal bias layer 404 does not affect the current flow. Moreover, since the longitudinal bias layer 404 is formed directly on the free layer, the longitudinal bias is sufficiently applied to the free layer 403. Accordingly, by using this configuration, it is possible to simultaneously obtain that the sense current flows through the ferromagnetic tunnel junction as is necessary and that the the longitudinal bias is applied to the free layer as is necessary.

In the above-given explanation, the lower electrode layer 402 is formed on the lower shield layer 401. However, it is also possible to provide an insulation layer as a lower gap layer between the lower shield layer 401 and the lower electrode layer 402. Moreover, the lower shield layer 401 and the lower electrode layer 402 may be formed as a single common layer. It is also possible to provide an undercoat layer between the lower electrode layer 402 and the free layer 403.

Figure 5:
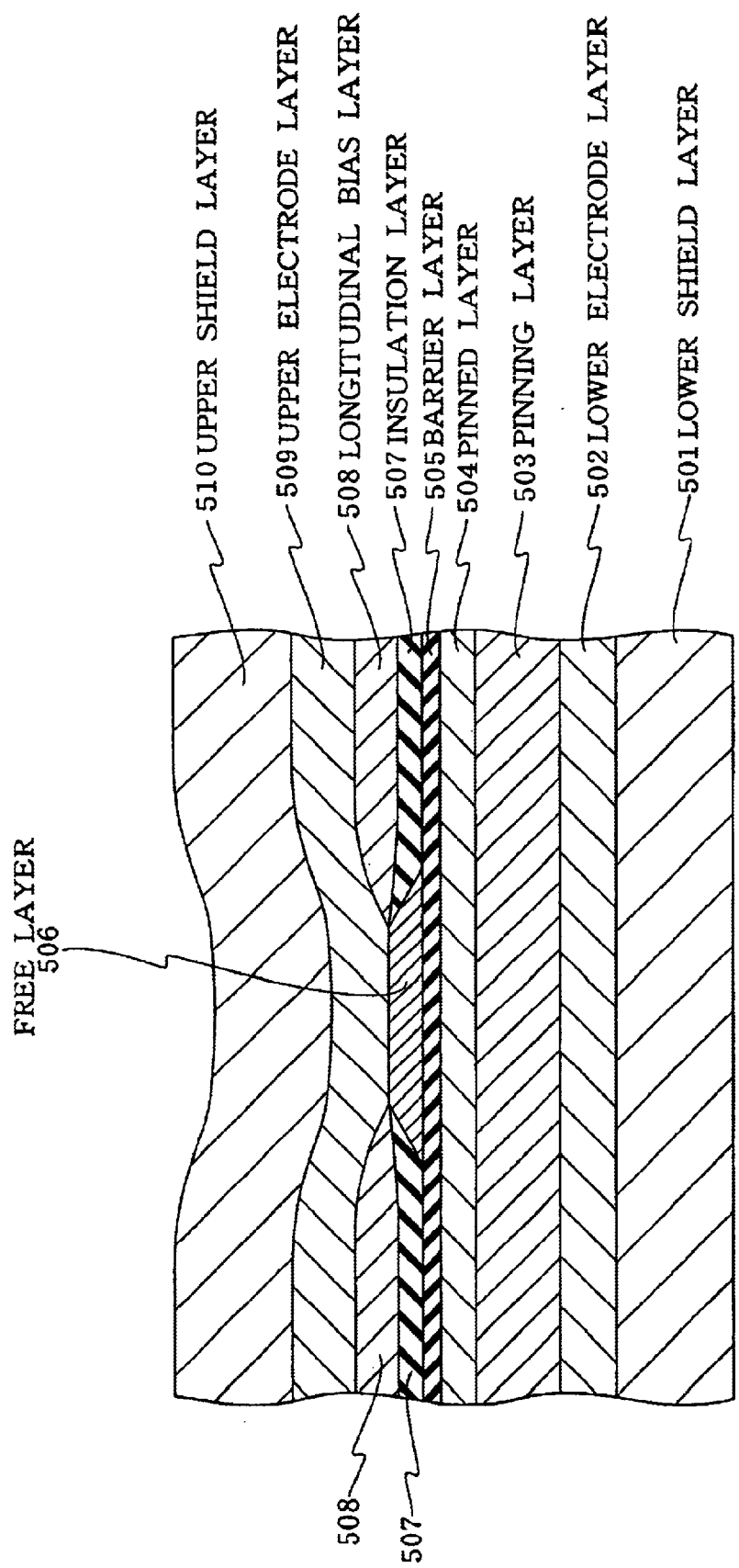
FIG. 5 is a conceptual cross sectional view of a fifth example of the MR head according to the present invention cut off in parallel to the ABS.

FIG. 5 is a conceptual cross sectional view of a fifth example of the MR head according to the present invention cut off in parallel to the ABS. This fifth example corresponds to claim 6. Hereinafter, explanation will be given with reference to this FIG. 5.

In this configuration, on a substrate (not depicted), a lower shield layer 501, a lower electrode layer 502, a pinning layer (anti-ferromagnetic layer) 503, a pinned layer 504, and a barrier layer 505 are successively formed. Thereon, a patterned free layer 506 is formed. At the right and left of the free layer 506, insulation layers 507 and longitudinal bias layers 508 are arranged so that their ends are in contact with the free layer 506. Furthermore, thereon, an upper electrode layer 509 and an upper shield layer 510 are formed. The combination of an undercoat layer (not depicted), the pinning layer 503, the pinned layer 504, the barrier layer 505, and the free layer 506 constitutes an MTJ film.

In this configuration, if a current is made to flow from the upper electrode layer 509 to the lower electrode layer 502, the current flows from the upper electrode layer 509 and passes through the free layer 506, the barrier layer 505, the pinned layer 504, the pinning layer 503, reaching the lower electrode layer 502. Here, the longitudinal bias layer 508, which is electrically insulated by the insulation layer 507 and the barrier layer 505 from the pinned layer 504 and below, does not affect the current flow. Moreover, since the longitudinal bias layer 508 is in contact with the free layer 506, the longitudinal bias is sufficiently applied to the free layer 506. Accordingly, by using this configuration, it is possible to simultaneously obtain that the sense current flows through the ferromagnetic tunnel junction as is necessary and that the longitudinal bias is applied to the free layer as is necessary.

In the above-given explanation, the lower electrode layer 502 is formed on the lower shield layer 501, and the upper shield layer 510 is formed on the upper electrode layer 509. However, it is also possible to provide an insulation layer as a lower gap layer between the lower shield layer 501 and the lower electrode layer 502 or between the upper electrode layer 509 and the upper shield layer 510. Moreover, the lower shield layer 501 and the lower electrode layer 502 may be formed as a single common layer. Similarly, the upper electrode layer 509 and the upper shield layer 510 may be formed as a single common layer. It is also possible to provide an undercoat layer between the lower electrode layer 502 and the free layer 506 and to provide an overcoat layer between the pinning layer (anti-ferromagnetic layer) 503 and the upper electrode layer 509. Moreover, in this case, only the free layer 506 is patterned among the layers constituting the MTJ film. This means that at least the free layer 506 should be patterned, and it is possible to select to pattern the other layers.

Figure 6:
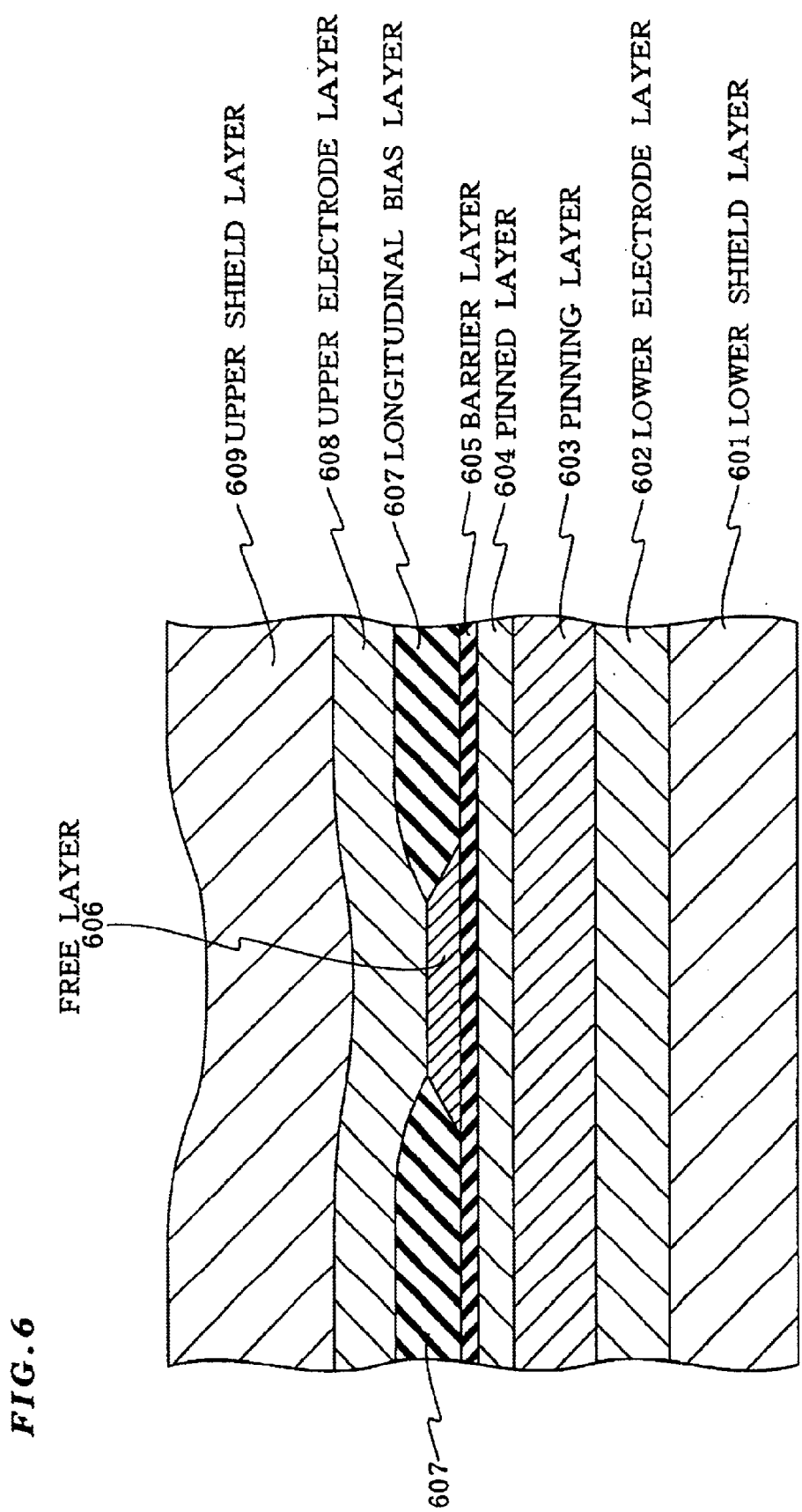
FIG. 6 is a conceptual cross sectional view of a sixth example of the MR head according to the present invention cut off in parallel to the ABS.

FIG. 6 is a conceptual cross sectional view of a sixth example of the MR head according to the present invention, cut off in parallel to the ABS. This sixth example corresponds to claim 7. Hereinafter, explanation will be given with reference to this FIG. 6.

In this configuration, on a substrate (not depicted), a lower shield layer 601, a lower electrode layer 602, a pinning layer (anti-ferromagnetic layer) 603, a pinned layer 604, and a barrier layer 605 are successively formed. Thereon, a patterned free layer 606 is formed. The free layer 606 is sandwiched from right and left by a longitudinal bias layer 607 made from oxide and arranged in such a manner that its ends are in contact with the free layer 606. Furthermore, thereon, an upper electrode layer 608 and an upper shield layer 609 are formed. The combination of an undercoat layer (not depicted), the pinning layer 603, the pinned layer 604, the barrier layer 605, and the free layer 606 constitutes an MTJ film.

In this configuration if a current is made to flow from the upper electrode layer 608 to the lower electrode layer 602, the current flows from the upper electrode layer 608 and successively passes through the free layer 606, the barrier layer 605, the pinned layer 604, and the pinning layer 603, reaching the lower electrode layer 602. Here, the longitudinal bias layer 607 made from an oxide is an insulation layer and accordingly, does not affect the current flow. Moreover, since the longitudinal bias layer 607 is in contact with the free layer 606, the longitudinal bias is sufficiently applied to the free layer 606. Accordingly, by using this configuration, it is possible to simultaneously obtain that the sense current flows through the ferromagnetic tunnel junction as is necessary and that the longitudinal bias is applied to the free layer as is necessary.

In the above-given explanation, the lower electrode layer 602 is formed on the lower shield layer 601, and the upper shield layer 609 is formed on the upper electrode layer 608. However, it is also possible to provide an insulation layer as a gap layer between the lower shield layer 601 and the lower electrode layer 602 or between the upper electrode layer 608 and the upper shield layer 609. Moreover, the lower shield layer 601 and the lower electrode layer 602 may be formed as a single common layer. Similarly, the upper electrode layer 608 and the upper shield layer 609 may be formed as a single common layer. It is also possible to provide an undercoat layer between the lower electrode layer 602 and the pinning layer (anti-ferromagnetic layer) 603 and to provide an overcoat layer between the free layer 606 and the upper electrode layer 608. Moreover, in this example, only the free layer 606 is patterned among the layers of the MTJ film. However, it is possible to select the other layers to be patterned if at least the free layer 606 is patterned.

Figure 7:
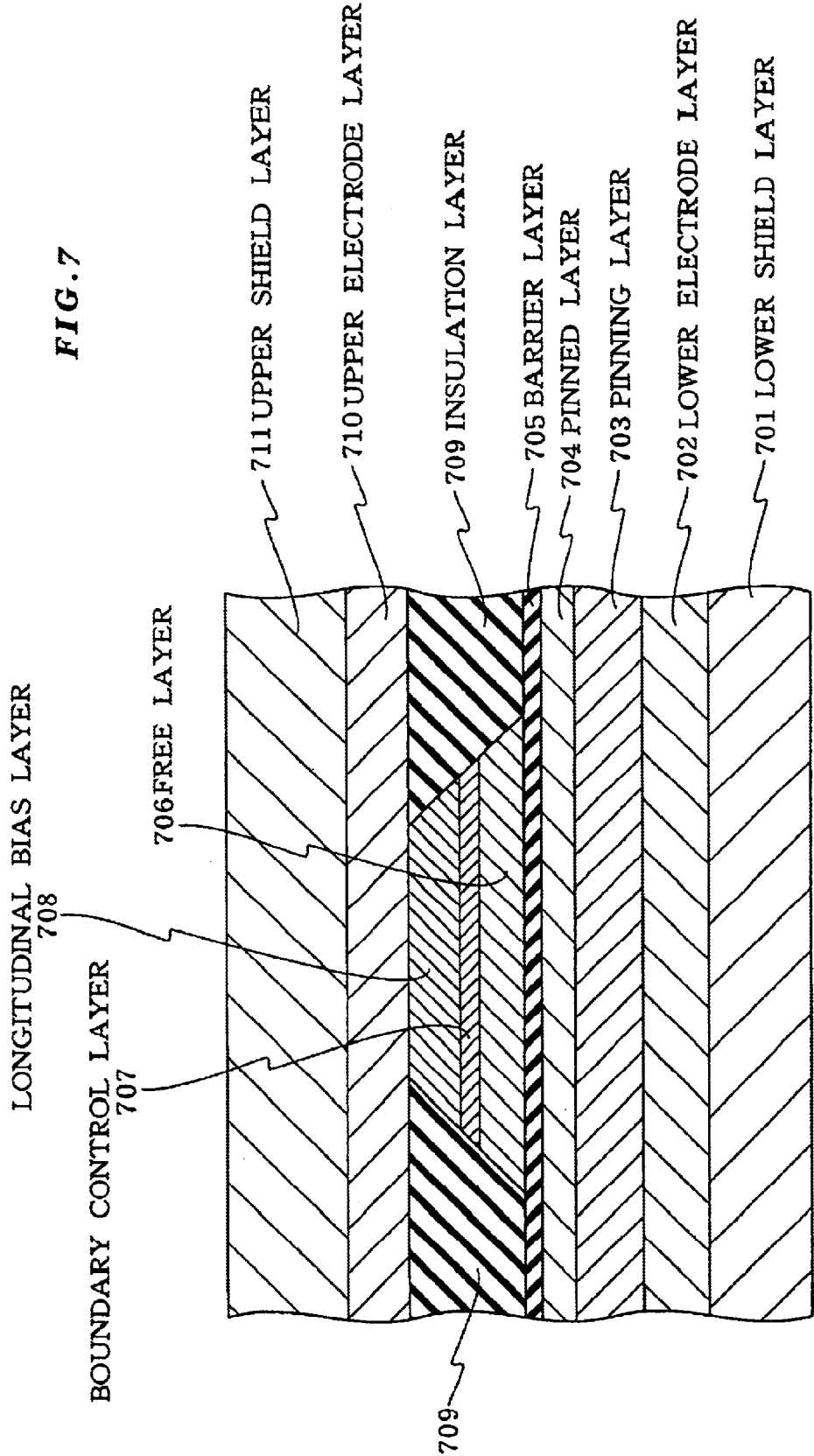
FIG. 7 is a conceptual cross sectional view of a seventh example of the MR head according to the present invention cut off in parallel to the ABS.
Figure 8:
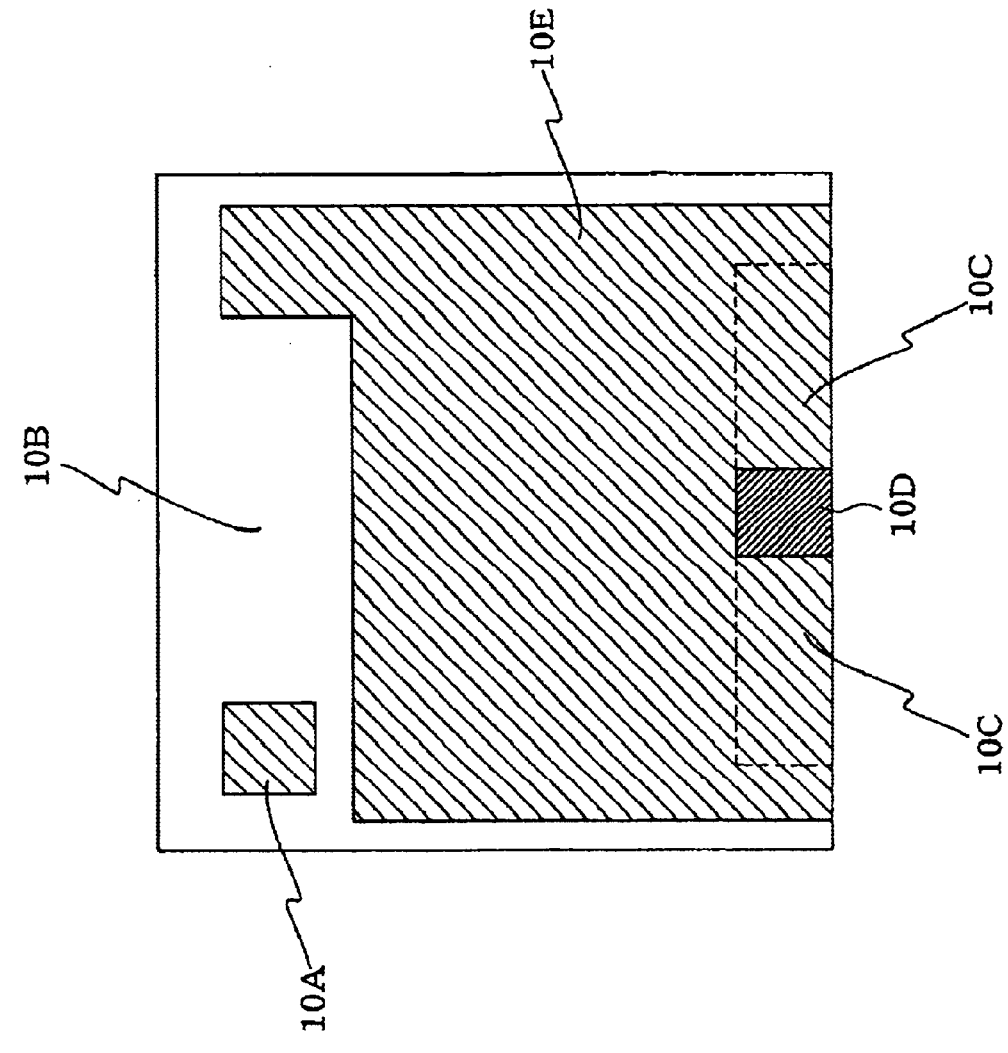
FIG. 8 is a conceptual plan view of the MR head of FIG. 1.
Figure 9:
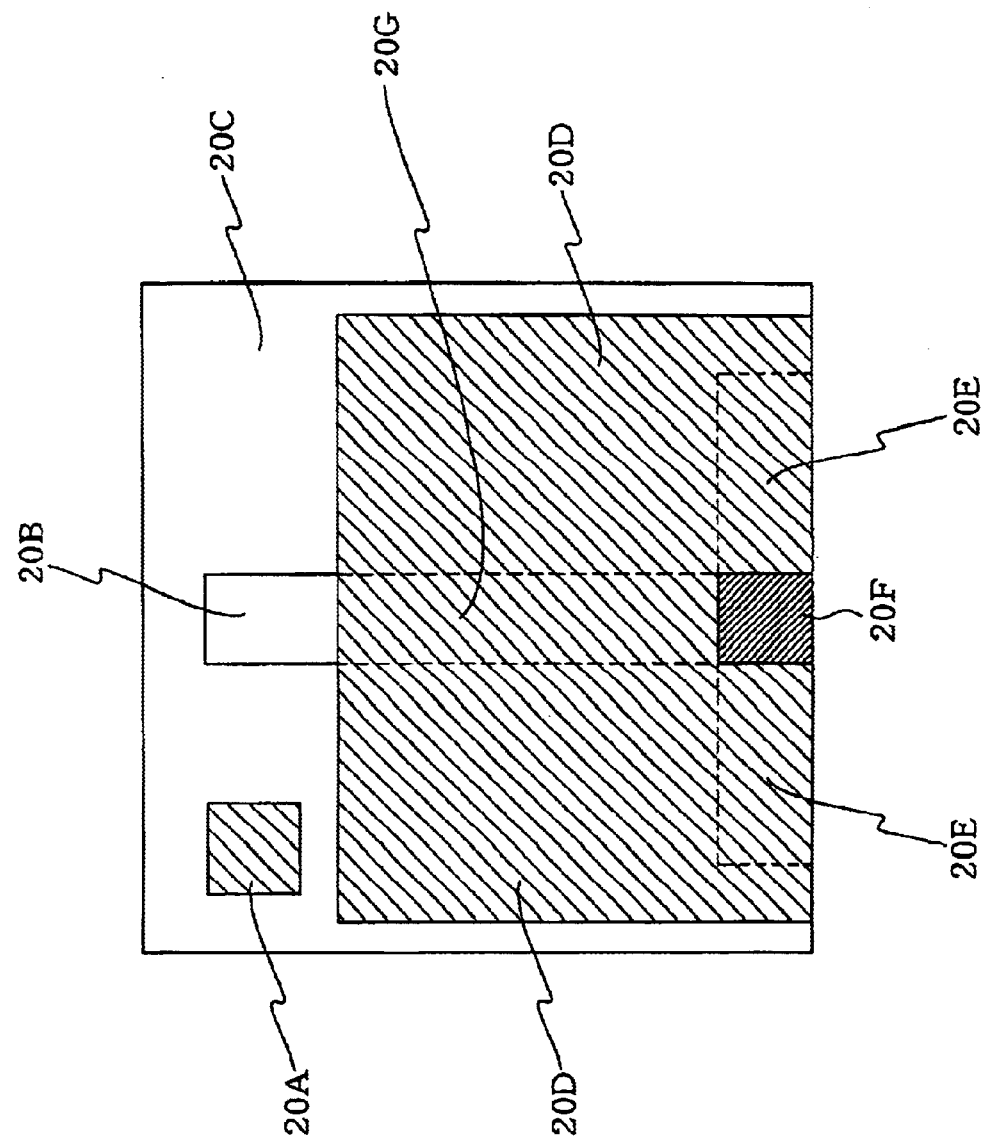
FIG. 9 is a conceptual plan view of the MR head of FIG. 2.

FIG. 7 is a conceptual cross sectional view of a seventh example of the MR head according to the present invention, cut off in parallel to the ABS. This seventh example corresponds to claim 8. Hereinafter, explanation will be given with reference to this FIG. 7.

In this configuration, on a substrate (not depicted), a lower shield 701, a lower electrode layer 702, a pinning layer 703, a pinned layer 704, and a barrier layer 705 are successively formed. Thereon, a patterned free layer 706, a patterned boundary control layer 707, and a patterned longitudinal bias layer 708 are formed. The longitudinal bias intensity is controlled by the boundary control layer 707 before it is applied to the free layer 706. The free layer 706 is sandwiched from right and left by an insulation layer 709. Furthermore, thereon, an upper electrode layer 710 and an upper shield layer 711 are formed. The combination of an undercoat layer (not depicted), the pinning layer 703, the pinned layer 704, the barrier layer 705, and the free layer 706 constitutes an MTJ film.

In this configuration, if a current is made to flow from the upper electrode layer 710 to the lower electrode layer 702, the current flows from the upper electrode layer 710 and successively passes through the longitudinal bias layer 708, the boundary control layer 707, the free layer 706, the barrier layer 705, the pinned layer 704, and the pinning layer 703, reaching the lower electrode layer 702. Moreover, since the longitudinal bias layer 708 is in contact with the free layer 706, the longitudinal bias is sufficiently applied to the free layer 706. Accordingly, by using this configuration, it is possible to simultaneously obtain that the sense current flows through the ferromagnetic tunnel junction as is necessary and that the longitudinal bias is applied to the free layer 706 as is necessary.

In the above-given explanation, the lower electrode layer 702 is formed on the lower shield layer 701 and the upper shield layer 711 is formed on the upper electrode layer 710. However, it is also possible to provide an insulation layer as a lower gap layer between the lower shield layer 701 and the lower electrode layer 702 or between the upper electrode layer 710 and the upper shield layer 711. Moreover, the lower shield layer 701 and the lower electrode layer 702 may be formed as a single common layer. Similarly, the upper electrode layer 710 and the upper shield layer 711 may be formed as a single common layer. It is also possible to provide an undercoat layer between the lower electrode layer 702 and the pinning layer (anti-ferromagnetic layer) 703 and to provide an overcoat layer between the upper electrode layer 710 and the boundary control layer 707. The boundary control layer 707 may be omitted by selecting an appropriate material for the longitudinal bias layer 708. Moreover, here, only the free layer 706 is patterned among the layers constituting the MTJ film. However, it is also possible to select the other layers to be patterned if the free layer is patterned.

FIG. 8 to FIG. 14 are conceptual plan views of the MR head shown in FIG. 1 to FIG. 7. In these figures, a hatched portion does not represent a cross section but a region. Here, the longitudinal bias layer is rectangular viewed from above. Actually, however, it is possible to use various shapes of the longitudinal bias layer.

Next, explanation will be given on components of the MR head of FIG. 1 to FIG. 7.

The substrate is made from altic, SiC, alumina, altic/alumina, SiC/alumina, or the like. The lower shield layer is made from NiFe, CoZr, CoFeB, CoZrMo, CoZrNb, CoZrTa, CoHf, CoTa, CoTaHf, CoNbHf, CoHfPd, CoTaZrNb, CoZrMoNi, FeAlSi and other alloys, iron nitrides, Mnzn ferrite, NiZn ferrite, MgZn ferrite as a simple substance, muti-layered film, or a mixture. The lower electrode layer is made from Au, Ag, Cu, Mo, W, Y, Ti, Zr, Hf, V, Nb, Pt, Ta and the like, as a simple substance, a multi-layered film, or a mixture. The boundary control layer is made from Al oxide, Si oxide, aluminium nitride, silicon nitride, diamond-like carbon, Au, Ag, Cu, Mo, W, Y, Ti, Zr, Hf, V, Pt, Nb, Ta or the like, as a simple substance, a multi-layered film, or a mixture. The upper electrode layer is made from Au, Ag, Cu, Mo, W, Y, Pt, Ti, Zr, Hf, V, Nb, Ta or the like, as a simple substance, a multi-layered film, or a mixture. The upper shield layer is made from NiFe, CoZr, CoFeB, CoZrMo, CoZrNb, CoZrTa, CoHf, CoTa, CoTaHf, CoNbHf, CoZrNb, CpHfPd, CoTaNb, CoZrMoNi, FeAlSi and other alloys, iron nitride, MnZn ferrite, NiZn ferrite, MgZn ferrite or the like, as a simple substance, a multi-layered film, or a mixture. The insulation layer is made from Al oxide, Si oxide, aluminium nitride, silicon nitride, diamond-like carbon or the like, as a simple substance, multi-layered film, or mixture. The lower gap layer is made from Al oxide, Si oxide, alulminium nitride, silicon nitride, or diamond-like carbon as a simple substance, multi-layered film, or mixture. The upper gap layer is made from Al oxide, Si oxide, alulminium nitride, silicon nitride, or diamond-like carbon as a simple substance, multi-layered film, or mixture. The overcoat layer is made from Au, Ag, Cu, Mo, W, Y, Ti, Pt, Zr, Hf, V, Nb, Ta or the like, as a simple substance, multi-layered film, mixture. The longitudinal bias layer is made from CoCrPt, CoCr, CoPt, CoCrTa, FeMn, NiMn, Ni oxide, NiCo oxide, Fe oxide, NiFe oxide, IrMn, PtMn, PtPdMn, ReMn, Co ferrite, Ba ferrite or the like, as a simple substance, multi-layered film, or mixture.

Next, the MTJ film will be detailed.

The tunnel junction film may have a configuration as follows.

1. substrate, undercoat layer, free layer, first MR enhance layer, barrier layer, second MR enhance layer, pinned layer, pinning layer, protection layer
2. substrate, undercoat layer, pinning layer, pinned layer, first MR enhance layer, barrier layer, second MR enhance layer, free layer, protection layer
3. substrate, undercoat layer, first pinning layer, first pinned layer, first MR enhance layer, barrier layer, second MR enhance layer, free layer, third MR enhance layer, barrier layer, fourth MR enhance layer, second pinned layer, second pinning layer, protection layer
4. substrate, undercoat layer, pinned layer, first MR enhance layer, barrier layer, second MR enhance layer, free layer, protection layer
5. substrate, undercoat layer, free layer, first MR enhance layer, barrier layer, second MR enhance layer, pinned layer, protection layer The undercoat layer may be a single-layered film, mixture film or multi-layered film made from a metal, oxide, nitride, or the like. More specifically, the undercoat layer is made from Ta, Hf, Zr, W, Cr, Ti, Mo, Pt, Ni, Ir, Cu, Ag, Co, Zn, Ru, Rh, Re, Au, Os, Pd, Nb, V, oxide, nitride of these elements, or the like, as a single-layered film, mixture film, or multi-layered film. It is also possible to use Ta, Hf, Zr, W, Cr, Ti, Mo, Pt, Ni, Ir, Cu, Ag, Co, Zn, Ru, Rh, Re, Au, Os, Pd, Nb, V and the like as an element to be added. The undercoat layer may not be used.

The free layer is made from NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi and the like as an alloy or amorphous magnetic material.

The barrier layer is made from an oxide, nitride, mixture of oxide and nitride, two-layered film of metal and oxide, or two-layered film of metal and nitride, or metal and mixture of oxide and nitride. More specifically, it is possible to use as powerful candidates an oxide or nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ni, or the like, as a simple substance, multi-layered film, or mixture, or a multi-layered film with oxide, nitride of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ni, or the like, as a single substance or multi-layered film or mixture.

The first and the second MR enhance layer is made from Co, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, coZrMoNi and other alloy or amorphous magnetic material. When the MR enhance layer is not used, the MR ratio is slightly lowered, but the number of production steps is also reduced.

The pinned layer may be formed from NiFe, CoFe, NiFeCo, FeCo, CoFeB, CoZrMo, CoZrNb, CoZr, CoZrTa, CoHf, CoTa, CoTaHf, CoNbHf, CoZrNb, CoHfPd, CoTaZrNb, CoZrMoNi and other alloys or amorphous magnetic materials. It is also possible to use these materials in combination with a simple substance, alloy, or multi-layered film using as a base Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ta, Pt, Ni and the like. Powerful candidates are Co/Ru/Co, CoFe/Ru/CoFe, CoFeNi/Ru/CoFeNi, Co/Cr/Co, CoFe/Cr/CoFe, CoFeNi/Cr/CoFeNi.

The pinning layer may be made from FeMn, NiMn, IrMn, RhMn, PtPdMn, ReMn, PtMn, PtCrMn, CrMn, CrAl, TbCo, Ni oxide, Fe oxide, a mixture of Ni oxide and Co oxide, a mixture of Ni oxide and Fe oxide, Two-layered film of Ni oxide/Co oxide, two-layered film of Ni oxide/Fe oxide, CoCr, CoCrPt, CoCrTa, PtCo, or the like. Power candidates are PtMn or PtMn added with Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ta, or the like.

The protection layer may be made from an oxide, nitride, mixture of oxide and nitride, a two-layered film of metal/oxide, a two-layered film of metal/nitride, or a two-layered film of metal/mixture of oxide and nitride. More specifically, oxide or nitride as a simple substance or multi-layered film or mixture of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ni, or these materials in combination with oxide or nitride as a simple substance or multi-layered film or mixture of Ti, V, Cr, Co, Cu, Zn, Y, Zr, Nb, Mo, Tc, Ru, Rh, Pd, Ag, Hf, Ta, W, Re, Os, Ir, Pt, Au, Si, Al, Ni, or Re. The protection layer may not be used.

FIG. 15 to FIG. 18 are conceptual plan views showing a first example of production method of the MR head of FIG. 3 to FIG. 10. Hereinafter, explanation will be given with reference to FIG. 3, FIG. 10, and FIG. 15 to FIG. 18.

Figure 15C:
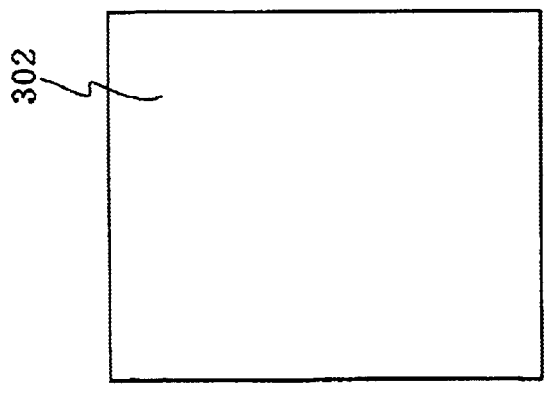
FIG. 15 is a conceptual plan view of a first example of a production method of the MR head shown in FIG. 3, proceeding from FIG. 15A to FIG. 15C.
Figure 15B:
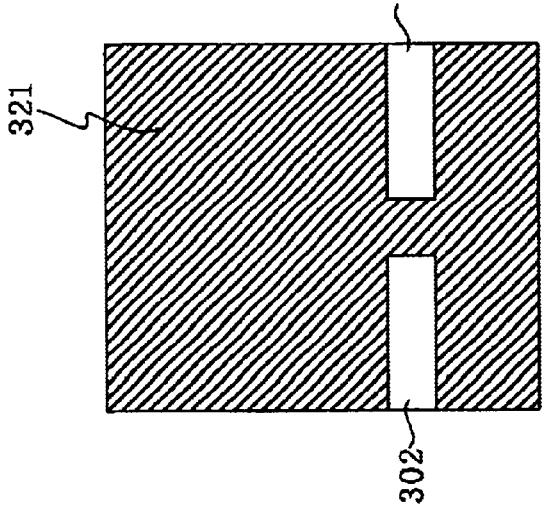
Figure 15A:
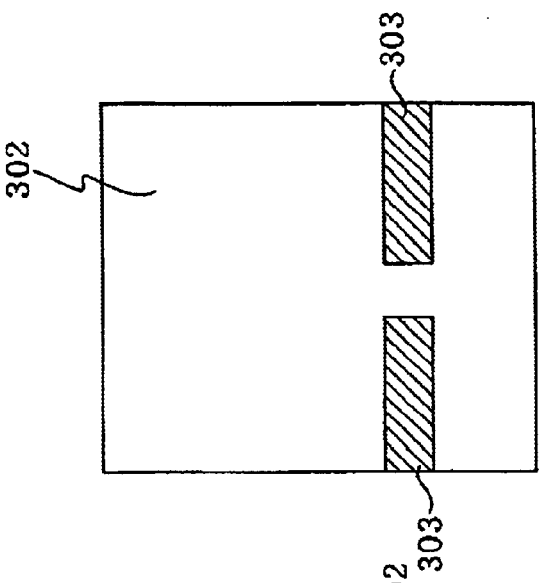

Firstly, on a substrate (not depicted), a lower shield layer 301 a lower gap layer (not depicted) and a lower electrode layer 302 are successively formed (FIG. 15A). The lower shield layer 301, the lower gap layer, and the lower electrode layer 302 are patterned into an appropriate shape by a photoresist (PR) step, and a lift-off or milling step. The lower gap layer may not be formed. Thereon, a stencil PR 321 is formed (FIG. 15B), a longitudinal bias layer 303 is formed, and lift-off is performed (FIG. 15C).

Figure 16A:
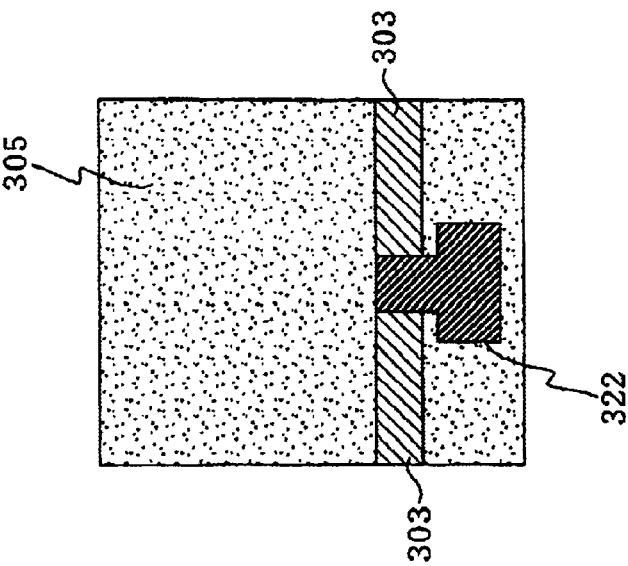
FIG. 16 is a conceptual plan view of the first example of the production method of the MR head shown in FIG. 3, proceeding from FIG. 16A to FIG. 16C.
Figure 16B:
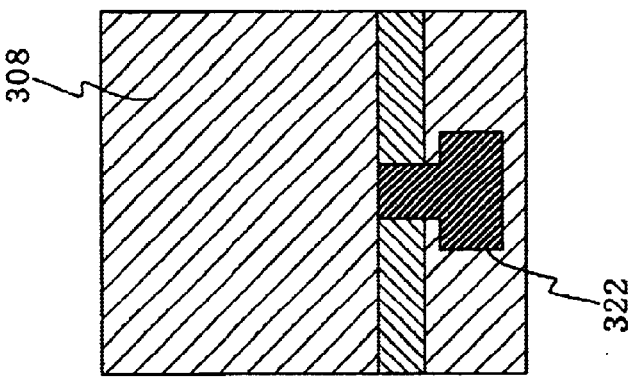
Figure 16C:
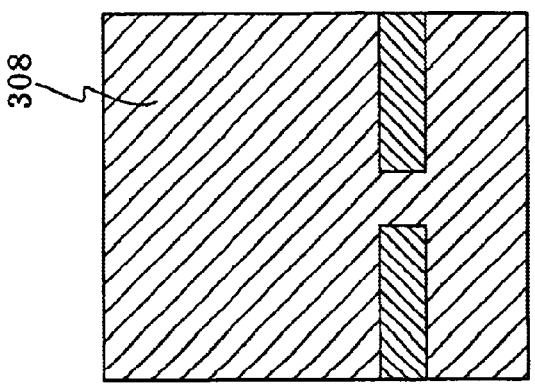

Subsequently, the MTJ film 304 to 307 and the first upper electrode layer 308 are formed (FIG. 16A) and patterned into an appropriate form. After this, a PR 322 is formed for patterning the MTJ film (FIG. 16B and milling is performed down to the barrier layer 305 (FIG. 16C). In this example, the milling is performed down to the barrier layer 305. However, there is also a case that milling is performed down to a layer below the barrier layer 305. The end surface of the MTJ film 304 to 307 shaved by milling is oxidized or nitrized by plasma oxidization after milling, natural oxidization after milling, nitrization after milling, milling in an atmosphere of (oxygen+Ar), milling in an atmosphere of (nitrogen+Ar), or the like. Thus, an oxide or nitride is formed.

Subsequently, an insulation layer 309 is formed and lift-off is performed (17A). After this, a hole is formed in the insulation layer 309 until the lower electrode layer 302 is exposed (FIG. 17B). Two holes 302A and 302B are to be formed. The hole 302A is a terminal of the lower electrode layer 302. The hole 302B is covered with an upper electrode layer 310, so that the hole 302B connects the upper electrode layer 310 to the lower electrode layer 302. The hole 302B may be formed at any position that disappears in the lapping step later. A plurality of the holes 302B may be formed. Thereon, a second upper electrode layer 210, an upper gap layer (not depicted), an upper shield layer 311 are successively formed and patterned (FIG. 17C). The upper gap layer may not be formed. The upper shield layer 311 may be formed as a single component together with a lower yoke in a recording head block 331.

Figure 18B:
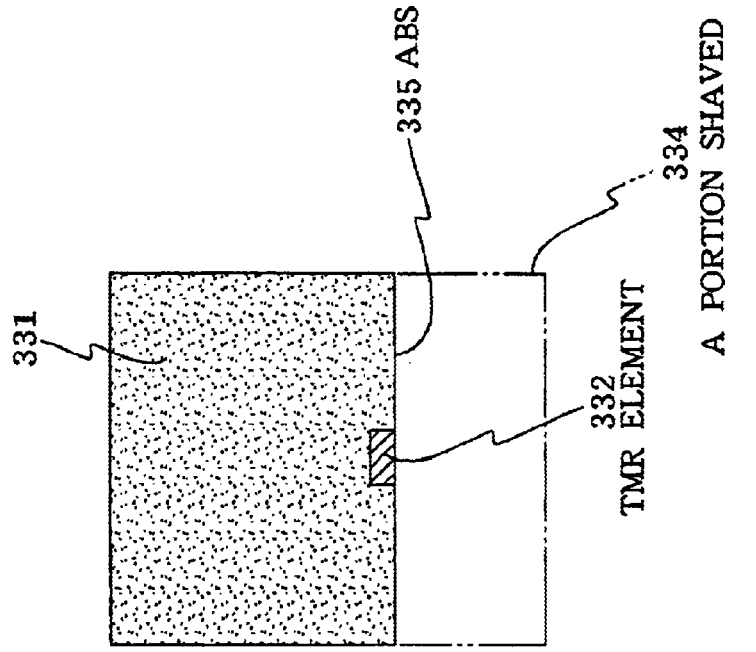
FIG. 18 is a conceptual plan view of the first example of the production method of the MR head shown in FIG. 3, proceeding from FIG. 18A to FIG. 18B.
Figure 18A:
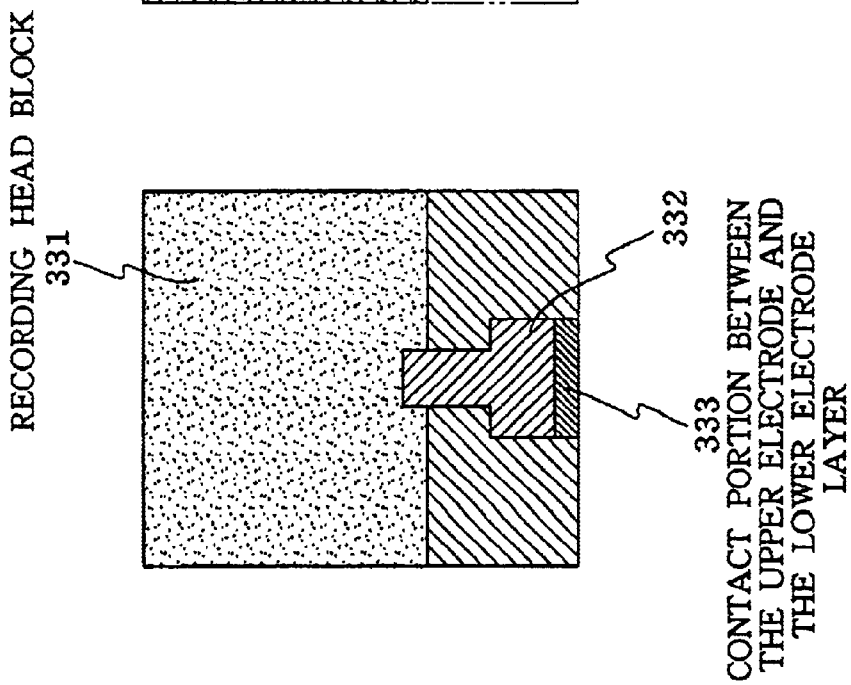

Subsequently, thereon, the recording head block 331 is formed (FIG. 18A). The recording head block may have any configuration, and here no particular configuration is depicted. In FIG. 18A, a portion 333 where the TMR element 332 and the upper electrode layer 310 are in contact with the lower electrode layer 302 is covered with the upper shield layer 311 and the recording head block 331 and not visible actually, but it is depicted as if it were visible. Here, the TMR element 332 is constituted by the lower electrode layer 202, the MTJ film 304 to 307, and the upper electrode layer 308, 310. When the recording head block 331 is formed, the upper electrode layer 308 is in short-circuit with the lower electrode layer 302 and electrically connected the free layer 304 of the MTJ film and the pinned layer 306. Accordingly, during forming of the recording head block 331, there is no danger of electrostatic destruction of the barrier layer 305. Lastly, lapping is performed to remove an unnecessary portion for functioning as a reproduction head and the TMR element 332 is exposed to the ABS 335. After this, for protection of the TMR element 332, the ABS 335 may be covered with a film made from the diamond-like carbon (DLC) or the like which has a large resistance against shock.

Figure 10:
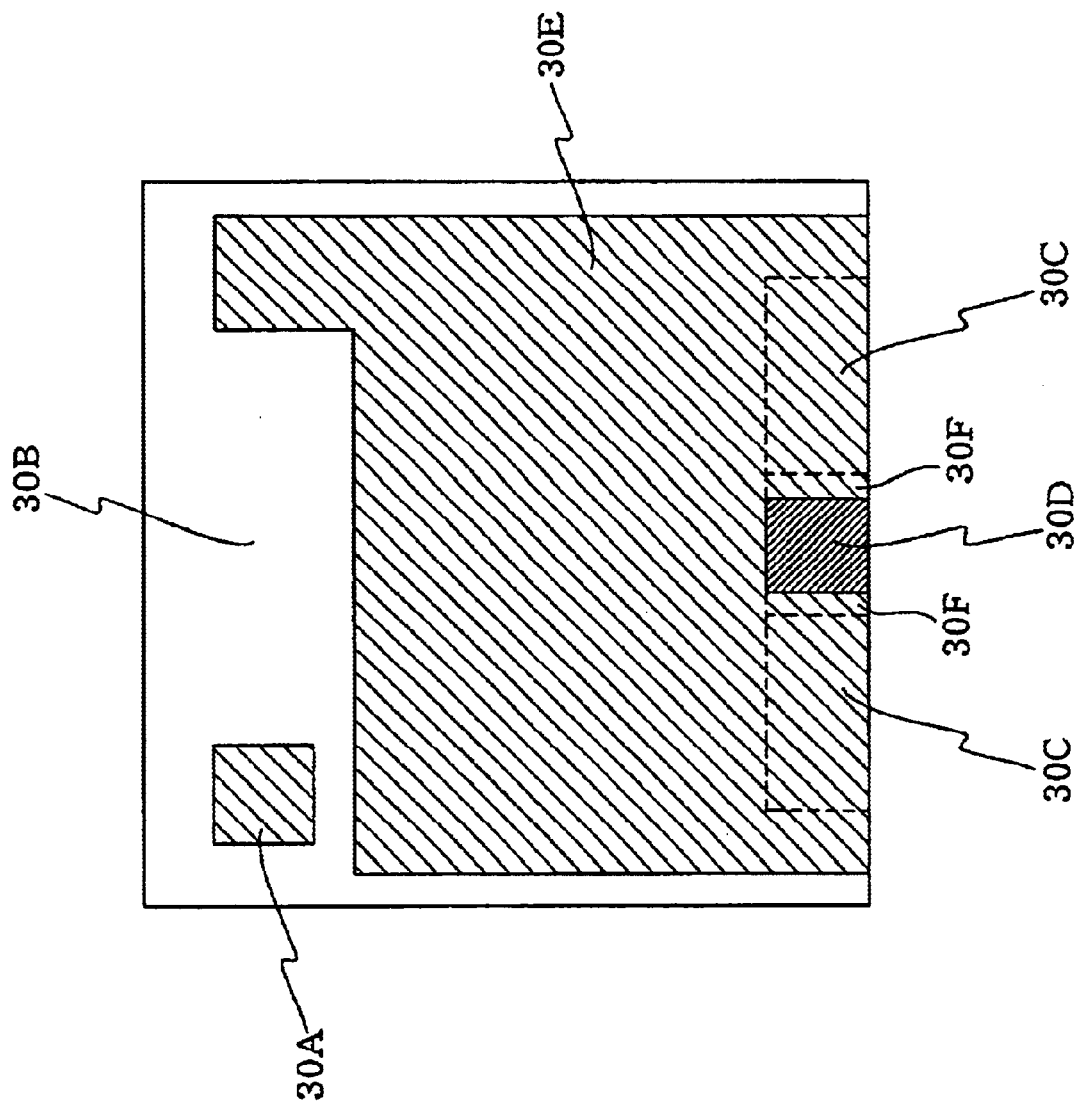
FIG. 10 is a conceptual plan view of the MR head of FIG. 3.
Figure 11:
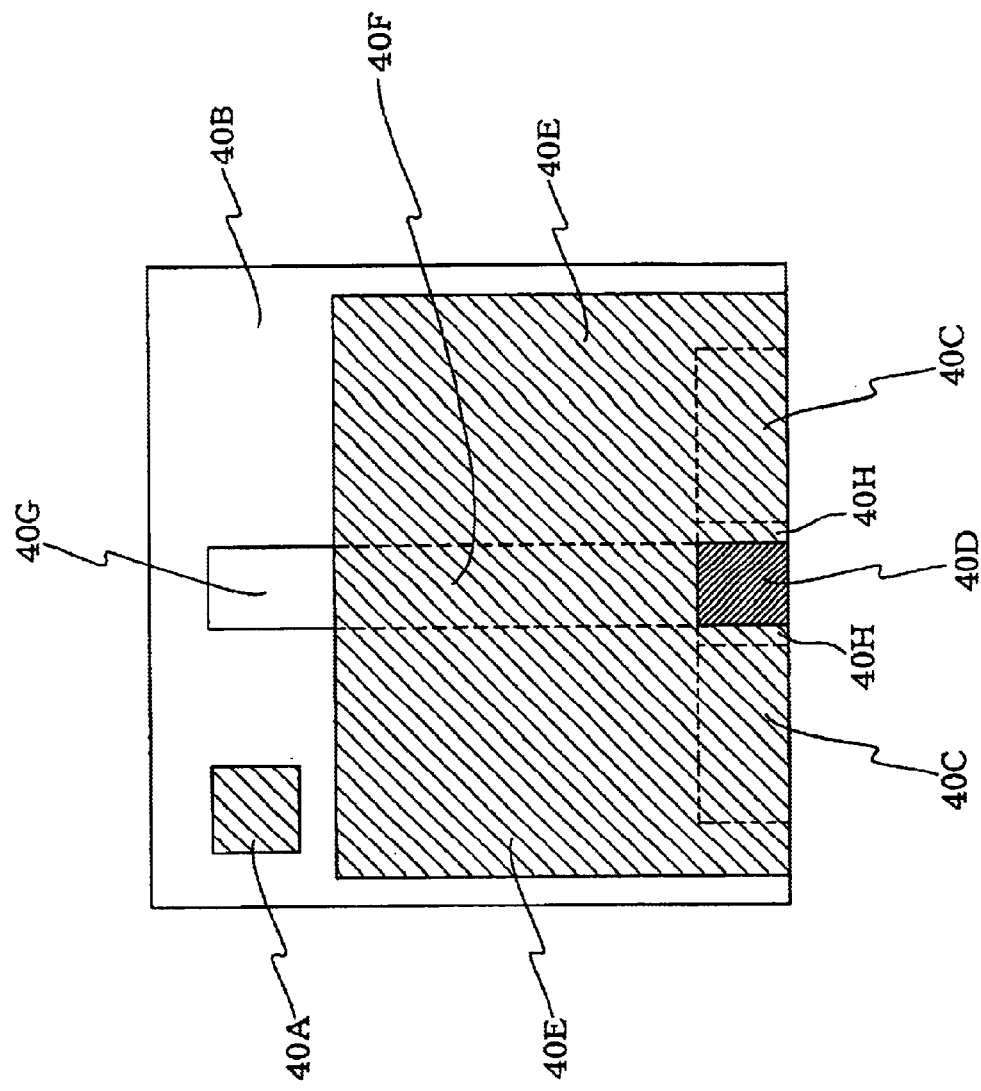
FIG. 11 is a conceptual plan view of the MR head of FIG. 4.
Figure 19C:
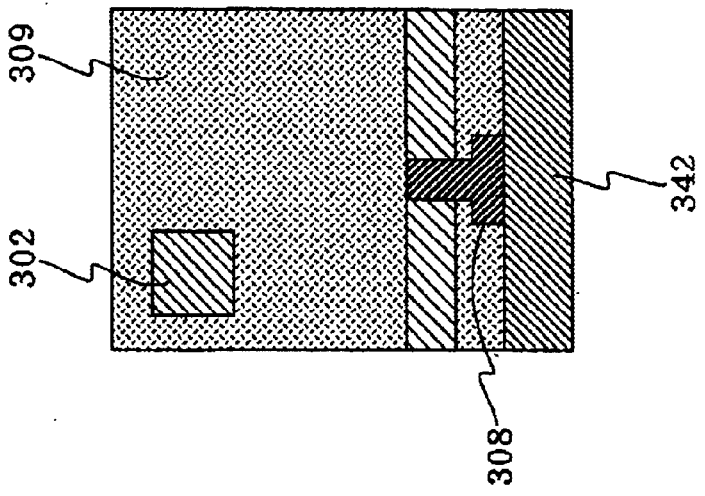
FIG. 19 is a conceptual plan view of a second example of the production method of the MR head shown in FIG. 3, proceeding from FIG. 19A to FIG. 19B.

FIG. 19 and FIG. 20 are conceptual plan views showing a second example of production method of the MR head shown in FIG. 3 and FIG. 10. Hereinafter, explanation will be given with reference to FIG. 3, FIG. 10, FIG. 19, and FIG. 20. Like components as in FIG. 15 to FIG. 18 are denoted by like reference symbols and their explanation will be omitted.

Figure 19B:
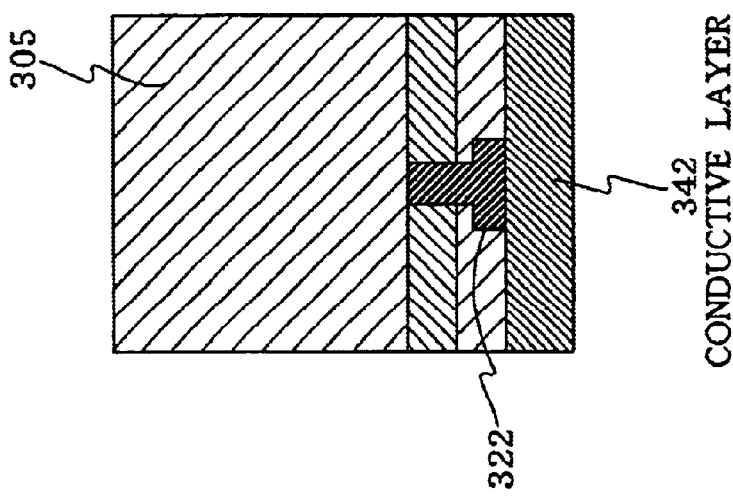
Figure 19A:
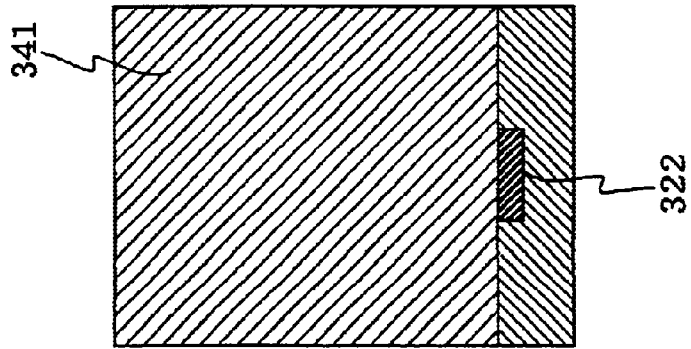

Since the steps from FIG. 15A to FIG. 16C are identical in this example and their explanation is omitted. Next, a PR 341 is formed (FIG. 19A) and milling is performed. The milling in this step is performed to a lower layer below the barrier layer 305. Subsequently, a conductive layer 342 is formed so that the free layer 304 is in electrical contact with the pinned layer 306 and the PR 341 is removed (FIG. 19B). The conductive layer 342 may be a metal conductive layer or non-metal conductive layer. When this milling is performed under a certain condition, the milling of a metal layer below the free layer 304 may cause a metal contact so that the free layer 304 is in electrical contact with the pinned layer 306. In this case, the formation of the conductive layer 342 can be omitted and the PR 341 is removed.

Subsequently, in the same way as the step shown in FIG. 17A, the insulation layer 309 is formed and lift-off is performed. After this, a hole is formed in the insulation layer 309 until the lower electrode layer 302 is exposed (FIG. 19C).

Thereon, a second upper electrode layer 210, an upper gap layer (not depicted), and an upper shield layer 311 are successively formed and patterned (FIG. 20A). The upper gap layer may not be formed. The upper shield layer 311 may be formed as a single component together with a lower yoke of the recording head block. Subsequently, thereon, the recording head block 331 is formed (FIG. 20B). Since the recording head block 331 may have any configuration, here, no particular configuration is shown. In FIGS. 20B and 20C, a portion 343 where the TMR element 332, the conductive layer 342, and the free layer 304 are in contact with the pinned layer is covered with the upper shield layer 311 and the recording head block 331 and not visible, but it is shown as if it were visible. In the step of FIG. 19B and after, the free layer 304 and the pinned layer 306 are short-circuited and accordingly, there is no danger of electrostatic destruction of the barrier layer 305. Lastly, lapping is performed to remove an unnecessary portion for functioning as a reproduction head and the TMR element 332 is exposed to the ABS 335. After this, for protection of the TMR element 332, the ABS 335 may be covered with the diamond-like carbon (DLC) or the like which has a large resistance against shock.

FIG. 21 and FIG. 22 are conceptual plan views showing a third example of production method of the MR head shown in FIG. 3 and FIG. 10. Hereinafter, explanation will be given with reference to FIG. 3, FIG. 10, FIG. 21, and FIG. 22. Like components as in FIG. 15 to FIG. 18 are denoted by like reference symbols and their explanation will be omitted.

Figure 21A:
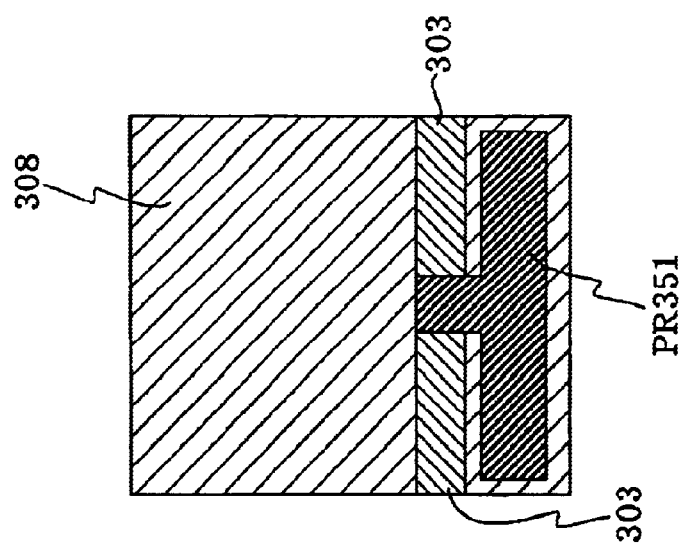
FIG. 21 is a conceptual plan view of a third example of the production method of the MR head shown in FIG. 3, proceeding from FIG. 21A to FIG. 21C.

The steps FIG. 15A to FIG. 16A are identical in this example and their explanation is omitted. Subsequently, a PR 351 is formed for patterning the MTJ film (FIG. 21A). Here, the PR 351 for patterning the MTJ film should have a sufficiently large area compared to the MTJ junction area consisting of the pinned layer 306, the barrier layer 305, and the free layer 304 when the last step is complete. This is for maintaining the junction area sufficiently large during the time before lapping step so that resistance between the free layer 304 and the pinned layer 306 is sufficiently small, thus preventing destruction of the barrier layer 305 due to ESD or the like.

Figure 21B:
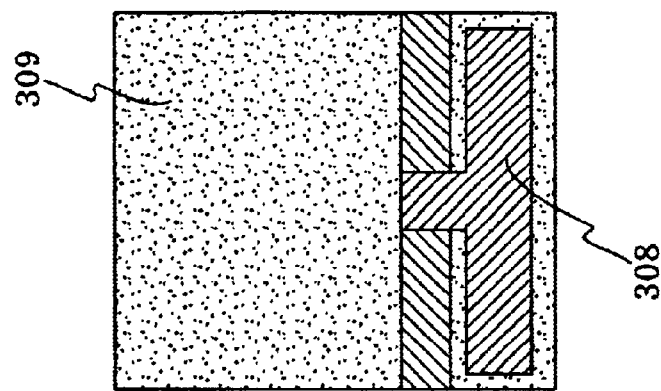
Figure 21C:
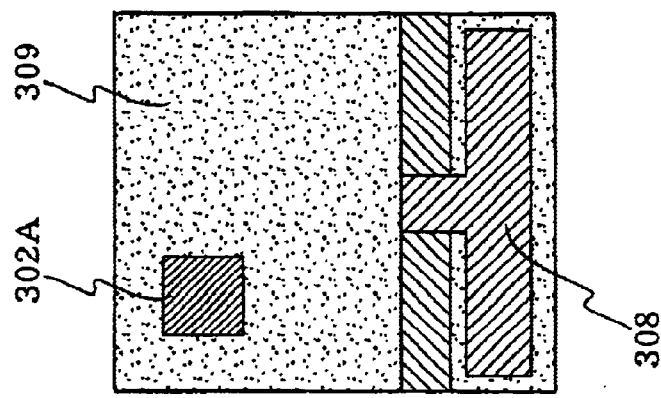

Subsequently, the MTJ film 304 to 307 is subjected to ion milling. The milling need not shave the entire MTJ film but it is possible to stop in the middle. When the milling is complete, the entire surface is covered with an insulation film 309 and lift-off is performed (FIG. 21B). Subsequently, milling is performed to form a hole in the insulation film 309 and the barrier layer 305 (FIG. 21C).

Subsequently, a second upper electrode layer 310 is formed and patterned, and an upper gap layer (not depicted) is formed. Then, an upper shield layer 311 is formed and patterned (FIG. 22A). The upper gap layer may not be formed. The upper shield layer 311 may be common to a lower yoke of a recording head block. Subsequently, the recording head block 331 is formed (FIG. 22B). Lastly, lapping is performed to remove an unnecessary portion and the ABS 335 is processed so that the element has an appropriate height (FIG. 22C). In FIGS. 22B and 22C, the TMR element 352 is covered with the upper shield layer 311 and the recording head block 331 and is not visible, but it is shown as if it were visible. After this, it is possible to form a film from the diamond-like carbon (DLC) or the like which has a large resistance against shock.

Figure 12:
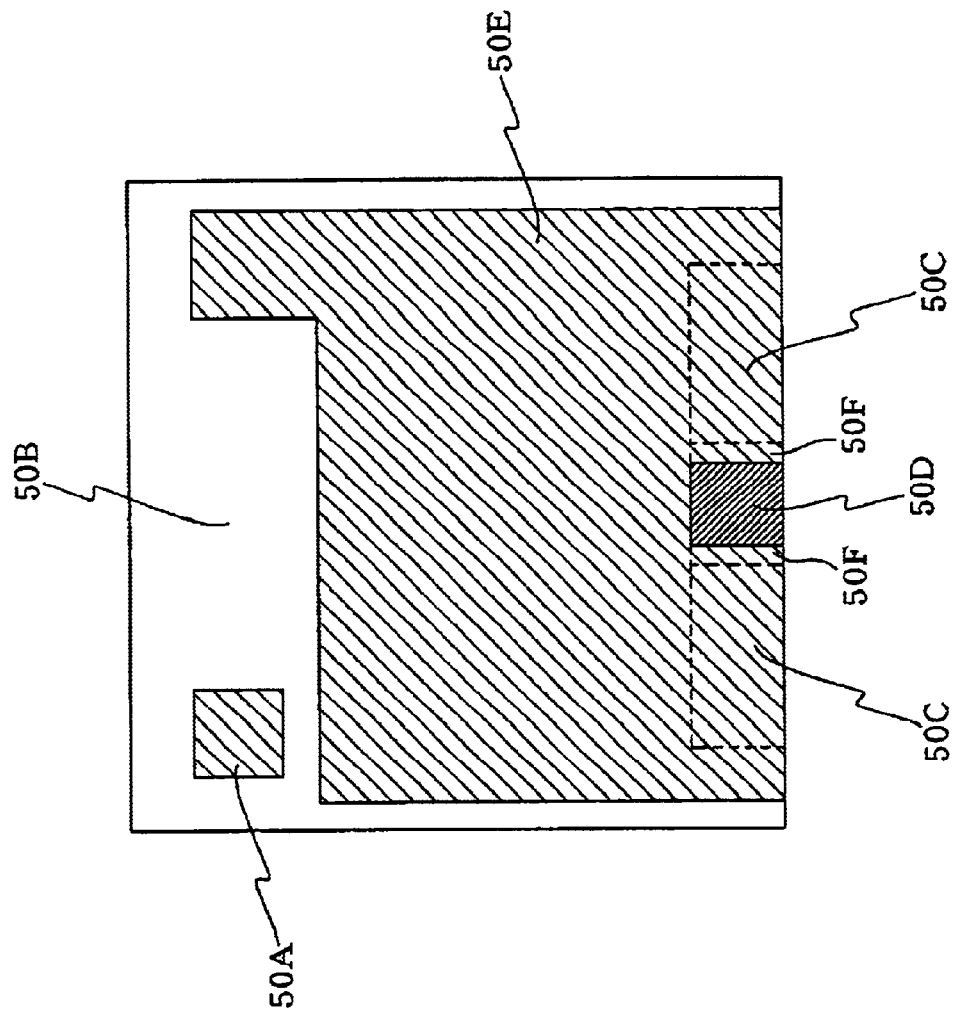
FIG. 12 is a conceptual plan view of the MR head of FIG. 5.
Figure 13:
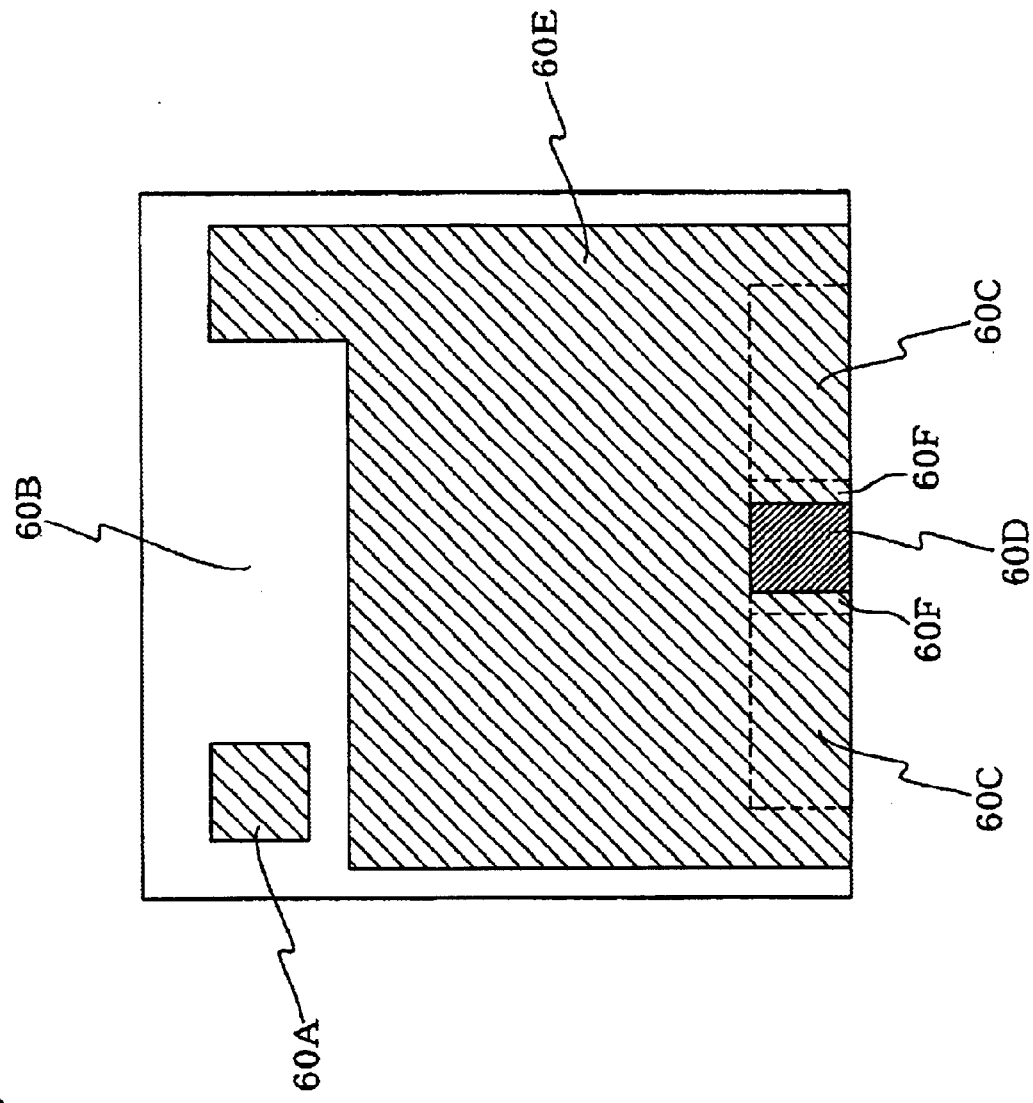
FIG. 13 is a conceptual plan view of the MR head of FIG. 6.
Figure 14:
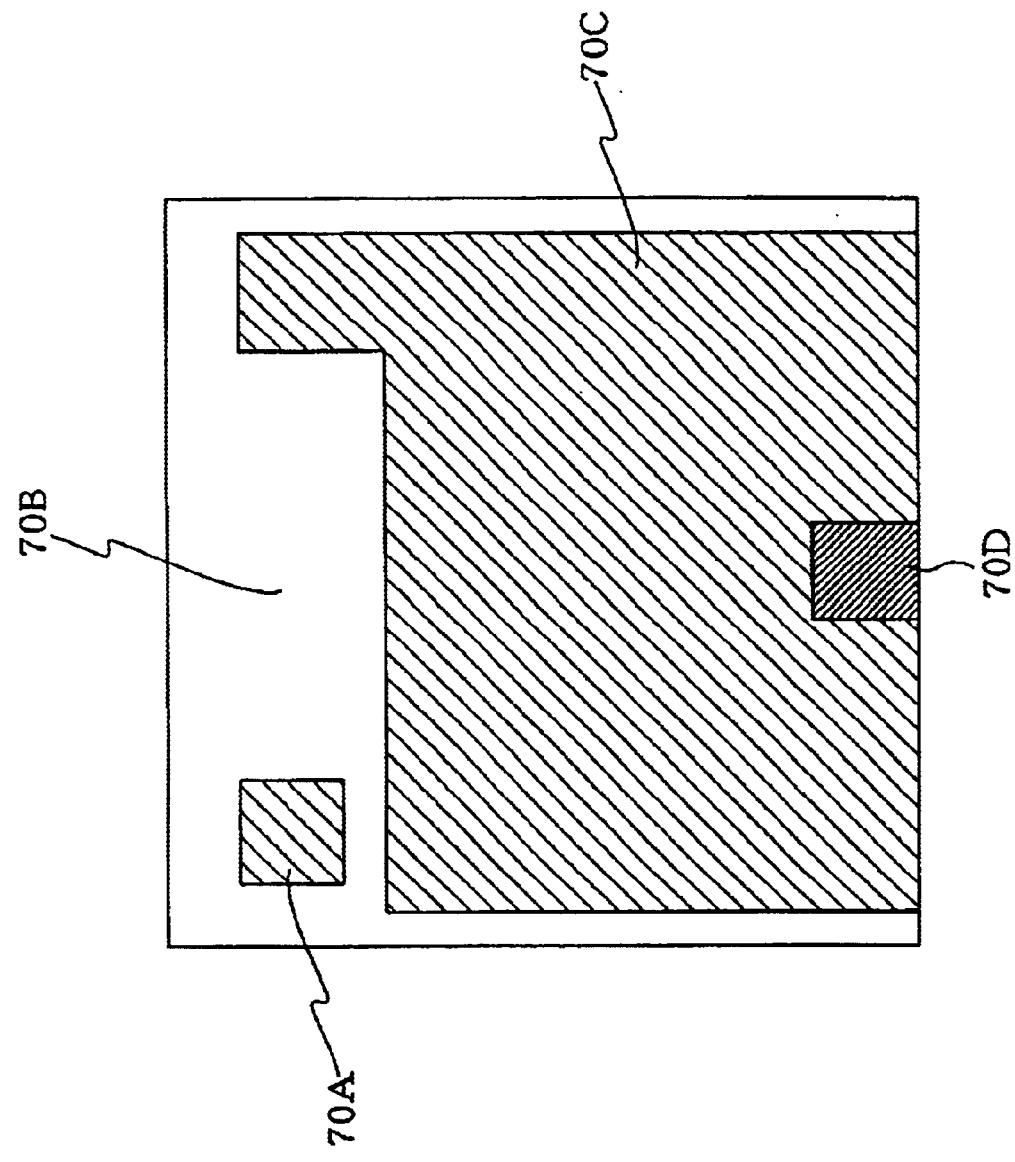
FIG. 14 is a conceptual plan view of the MR head of FIG. 7.

FIG. 23 to FIG. 26 are conceptual plan views showing a first example of the production method of the MR head shown in FIG. 5 and FIG. 12. Hereinafter, explanation will be given with reference to FIG. 5, FIG. 12, and FIG. 23 to FIG. 26.

Firstly, on a substrate (not depicted), a lower shield layer 501, a lower gap layer (not depicted), a lower electrode layer 502, and a MTJ film 503 to 506 are successively formed (FIG. 23A). The lower shield layer 501, the lower gap layer, and the lower electrode layer 502 are patterned into an appropriate shape. The lower gap layer may not be formed. Thereon, a stencil PR 521 is formed for patterning the MTJ film (FIG. 23B), and milling is performed down to the barrier layer 505 (FIG. 23C). Here, the milling is performed down to the barrier layer 505, but the milling may be performed down to a layer below the barrier layer 505. The end surface of the MTJ film 503 to 506 shaved by the milling may be covered with an oxide or nitride formed by plasma oxidation after the milling, the natural oxidation after the milling, nitrization after the milling, milling in the atmosphere of (oxygen+Ar), milling in the atmosphere of (nitrogen+Ar), or the like.

Figure 24C:
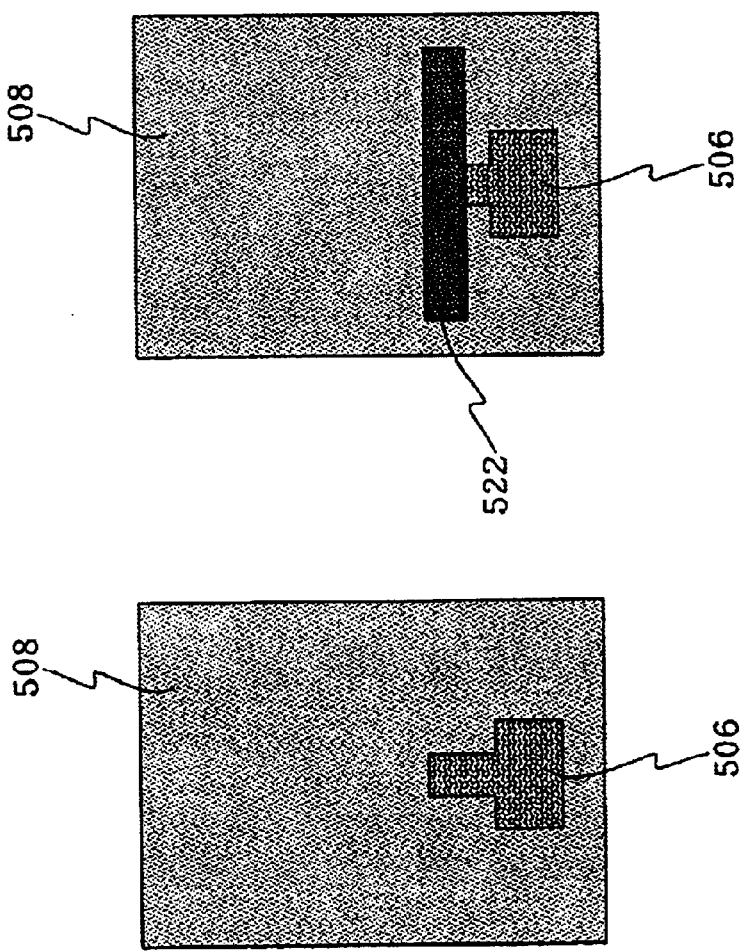
FIG. 24 is a conceptual plan view of the first example of the production method of the MR head shown in FIG. 5, proceeding from FIG. 24A to FIG. 24C.
Figure 24B:
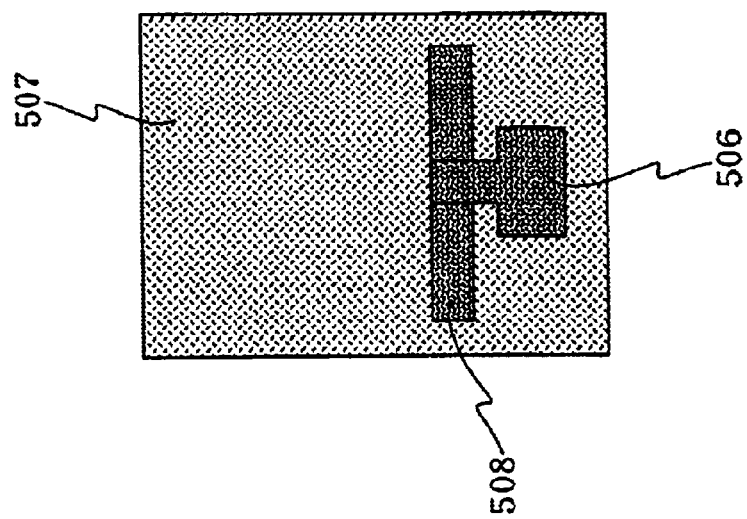
Figure 24A:
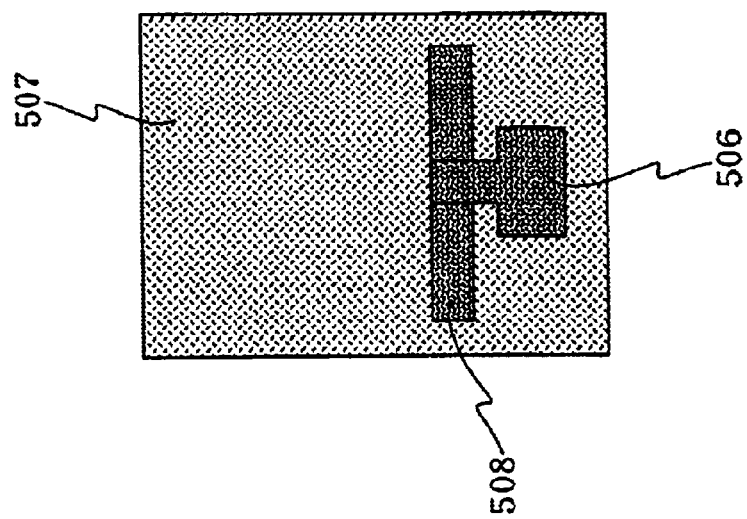

Subsequently, an insulation layer 507 and a longitudinal bias layer 508 are successively formed and lift-off is performed (FIG. 24A). Furthermore, a PR 522 is formed (FIG. 24B) and milling is performed down to the insulation layer 507 before the PR 522 is removed (FIG. 24C). The insulation layer 507 and the longitudinal bias layer 508 are patterned into an appropriate shape.

Figure 25A:
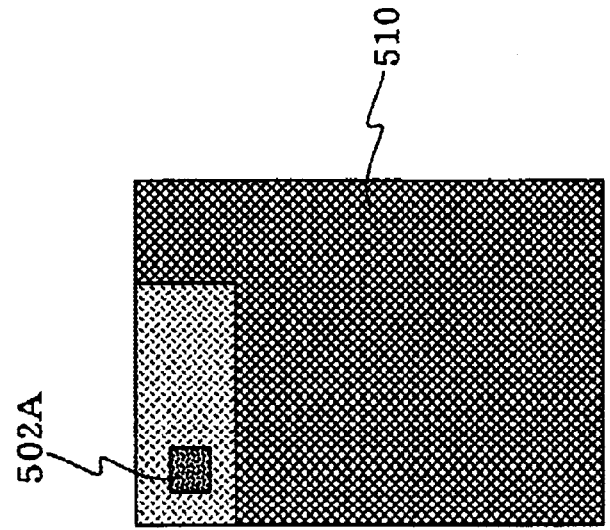
FIG. 25 is a conceptual plan view of the first example of the production method of the MR head shown in FIG. 5, proceeding from FIG. 25A to FIG. 25B.
Figure 25B:
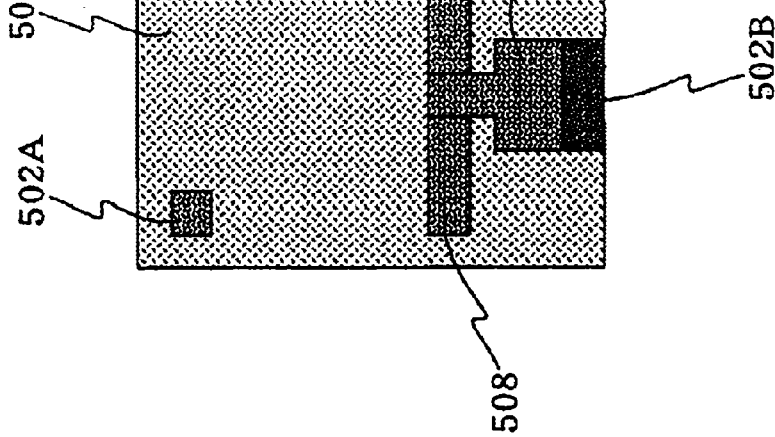

Subsequently, a hole is formed through the insulation layer 507 and the barrier lawyer 505 until the lower electrode layer 502 is exposed (FIG. 25A). Two holes 502A and 502B shown in FIG. 25A are to be formed. The hole 502A is a terminal of the lower electrode layer 502, and the hole 502B is covered with an upper electrode layer 509, so that the lower electrode layer 502 is connected to the upper electrode layer 509. The hole 502B may be at any position that disappears in the lapping step later. There may be a plurality of holes 502B. Thereon, the upper electrode layer 509, an.upper gap layer (not depicted), and the upper shield layer 510 are formed and patterned (FIG. 25B). The upper gap layer may not be formed. The upper shield layer 510 may be common to a lower yoke in a recording head block.

Figure 26A:
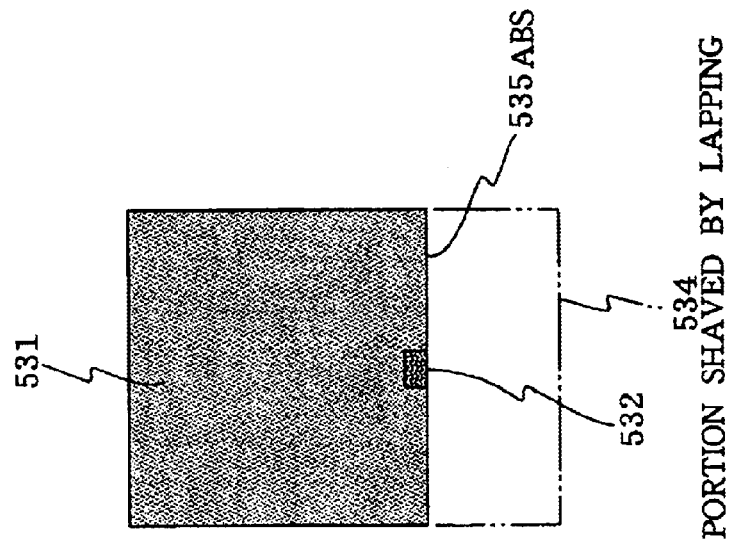
FIG. 26 is a conceptual plan view of the first example of the production method of the MR head shown in FIG. 5, proceeding from FIG. 26A to FIG. 26B.
Figure 26B:
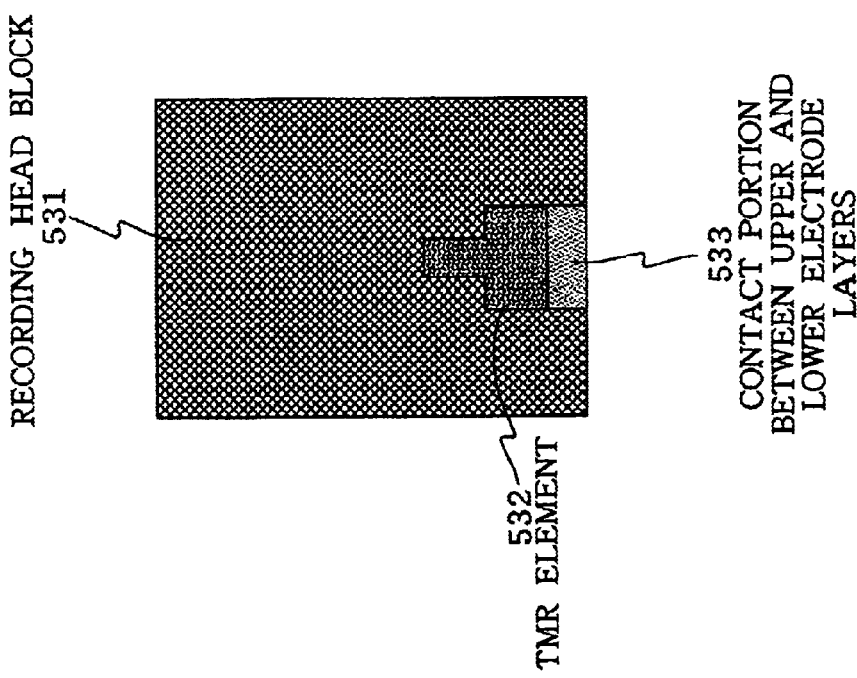

Subsequently, thereon, the recording head block 531 is formed (FIG. 26A). The recording head block 531 may have any structure and no structure is shown in the figure. After the step of FIG. 26A is complete, a portion where the TMR element 532 and the upper electrode layer 509 are in contact with the lower electrode layer 502 is covered with the upper shield layer 510 and the recording head block 531 and is not visible, but it is shown in the figure as if it were visible. At the step of forming the recording head block 531, the upper electrode layer 509 is short-circuited with the lower electrode layer 502, and accordingly the free layer 506 and the pinned layer 504 are electrically connected. Consequently, there is no danger of electrostatic destruction of the barrier layer 505 during formation of the recording head block 531. Subsequently, lapping is performed to remove an unnecessary portion for functioning as a reproduction head and the TMR element 532 is exposed to the ABS 535 (FIG. 26B). After this, for protection of the TMR element 532, it is possible to cover the ABS 535 with the diamond-like carbon (DLC) or the like which has a large resistance against shock.

FIG. 27 and FIG. 28 are conceptual plan views showing a second example of the production method of the MR head shown in FIG. 5 and FIG. 12. Hereinafter, explanation will be given with reference to FIG. 5, FIG. 12, FIG. 27, and FIG. 28.

The steps from FIG. 23A to FIG. 24C are identical in this example and their explanation is omitted. Subsequently, a PR 541 is formed (FIG. 27A) and milling is performed. The milling in this step should reach a lower layer below the barrier layer 505. Subsequently, a conductive layer 542 is formed so that the free layer 506 is in electrical contact with the pinned layer 504, and the PR 541 is removed (FIG. 27B). The conductive layer 542 may be a metal conductive layer or non-metal conductive layer. If this milling is performed under a certain condition, the milling of a metal layer below the barrier layer 505 often causes a metal contact, so that the free layer 506 is brought into electrical contact with the pinned layer 504. In this case, the PR 541 can be removed without formation of the conductive layer 542. Subsequently, a hole is formed in the insulation layer 507 and the barrier layer 505 until the lower electrode layer 502 is exposed (FIG. 27C).

Thereon, an upper electrode layer 509, an upper gap layer (not depicted), and an upper shield layer 510 are successively formed and patterned (FIG. 28A). The upper gap layer may not be formed. The upper shield layer 510 may be common to a lower yoke of a recording head block. Subsequently, thereon, the recording head block 531 is formed (FIG. 28B). Since the recording head block 531 may have any structure, no structure is shown in the figure. In FIG. 28B, a portion 543 where the TMR element 532, the conductive layer 542, and the free layer 506 are in contact with the pinned layer 504 is covered with the upper shield layer 510 and the recording head block 531 and not visible, but in the figure it is shown as if it were visible. In the step of FIG. 27B and after, the free layer 506 is short-circuited with the pinned layer 504 and accordingly, there is no danger of electrostatic destruction of the barrier layer 505. Lastly, lapping is performed to remove an unnecessary portion for functioning as a reproduction head and the TMR element 532 is exposed on the ABS 535. After this, for protection of the TMR element 532, it is possible to cover it with a film made from the diamond-like carbon (DLC) or the like which has a large resistance against shock.

FIG. 29 to FIG. 31 are conceptual plan views showing a third example of the production method of the MR head shown in FIG. 5 and FIG. 12. Hereinafter, explanation will be given with reference to FIG. 5, FIG. 12, and FIG. 29 to FIG. 31.

Figure 29A:
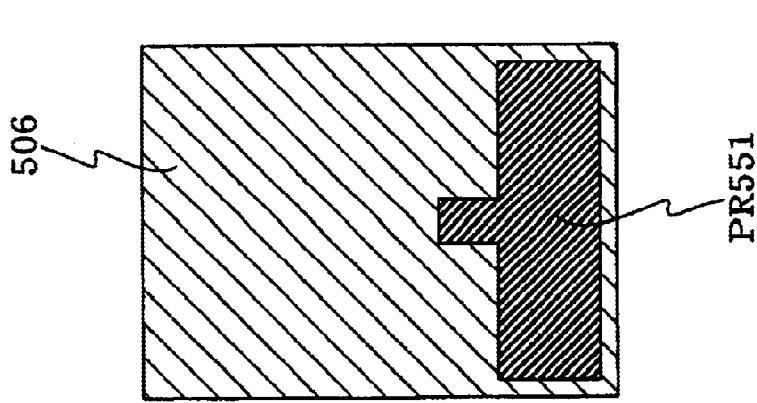
FIG. 29 is a conceptual plan view of a third example of a production method of the MR head shown in FIG. 5, proceeding from FIG. 29A to FIG. 29C.
Figure 29B:
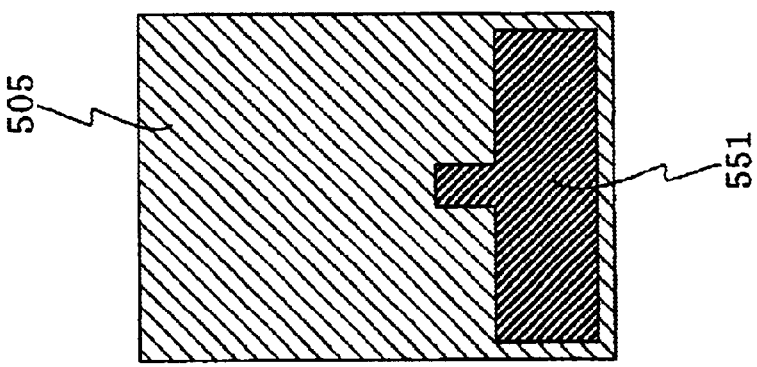
Figure 29C:
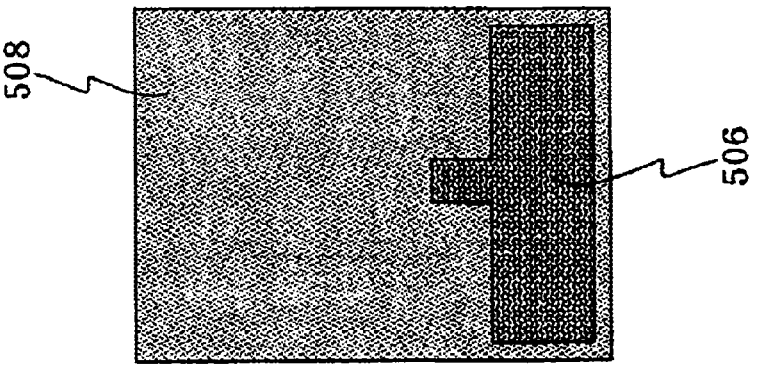

The step of FIG. 23A is identical in this example and its explanation is omitted. Subsequently, a stencil PR 551 is formed for patterning an MTJ film (FIG. 29A). Here, the stencil PR 551 should have a sufficiently large area compared to an MTJ junction area consisting of a pinned layer 504, a barrier layer 505, and a free layer 506 when the last step is complete. This is for maintaining a large junction area so as to minimize a resistance value between the free layer 506 and the pinned layer 504, thus preventing destruction of the barrier layer 505 due to ESD or the like. Subsequently, milling is performed for patterning the MTJ film 503 to 506 (FIG. 29B). This milling need not pattern the entire MTJ film 503 to 506 but can be stopped in the middle. Subsequently, an insulation film 507 and a longitudinal bias layer 507 are formed and lift-off is performed (FIG. 29C).

Subsequently, a PR (not depicted) is formed and the longitudinal bias layer 508 is patterned by milling (FIG. 30A). Subsequently, a PR (not depicted) is formed for opening a hole in the insulation layer 507 and the barrier layer 505. Milling is performed and the PR is removed (FIG. 30B). Subsequently, an upper electrode layer 509, an upper gap layer (not depicted), and upper and lower shield layer 10 are formed and patterned as is necessary (FIG. 30C). The upper gap layer may not be formed. The upper shield layer 510 may be common to a lower yoke of a recording head block.

Figure 31A:
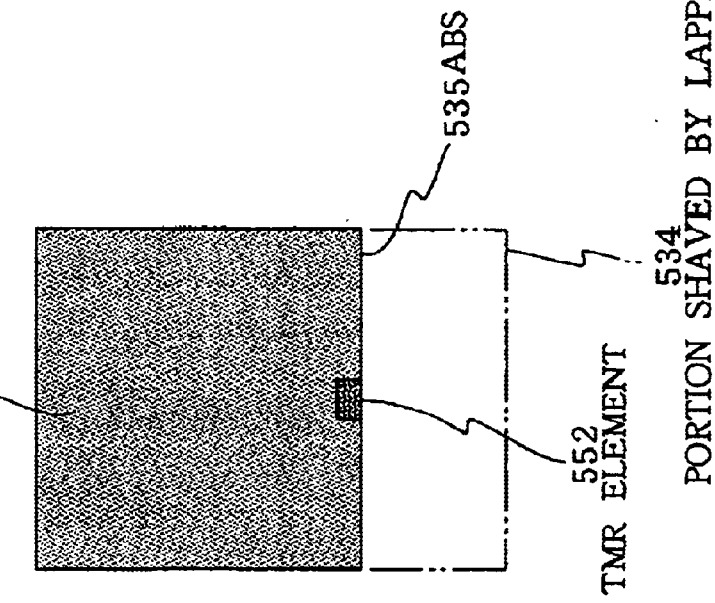
FIG. 31 is a conceptual plan view of the third example of the production method of the MR head shown in FIG. 5, proceeding from FIG. 31A to FIG. 31B.
Figure 31B:
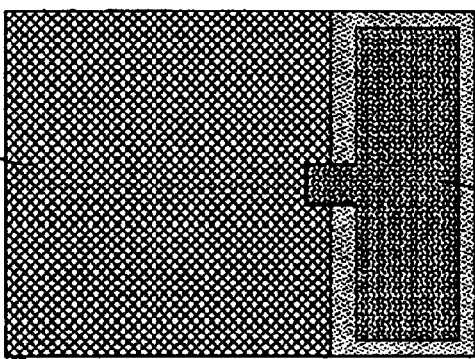

Subsequently, the recording head block 531 is formed (FIG. 31A). Lastly, lapping is performed so as to remove an unnecessary portion from the element and the ABS 535 is processed so as to obtain an appropriate element height (FIG. 31B). In FIGS. 31A and 31B, the TMR element 552 is covered with the upper shield layer 510 and the recording head block 531 and not visible, but it is shown here as if it were visible. After this, it is possible to form a protection film using the diamond-like carbon (DLC) or the like which has a large resistance against shock.

The MR head shown in FIG. 6 can be produced in the same way as the MR head shown in FIG. 23 to FIG. 26.

As has been described above, only the representative production methods of the MR head shown in FIG. 3, FIG. 5, and FIG. 6 have been explained. What is important is the upper electrode layer and the lower electrode layer are firstly in electrical contact with each other and the connecting portion is removed afterward by lapping, or the tunnel junction film is firstly formed to have a large area and the area is reduced afterward. The structure shown in FIG. 1, FIG. 2, FIG. 4, and FIG. 7 can also be produced in the same way as the ones shown in FIG. 3, FIG. 5, and FIG. 6, although explanation is omitted.

Next, explanation will be given on a recording/reproduction head and a magnetic recording/reproduction apparatus using the MR head produced according to the present invention.

Figure 32A:
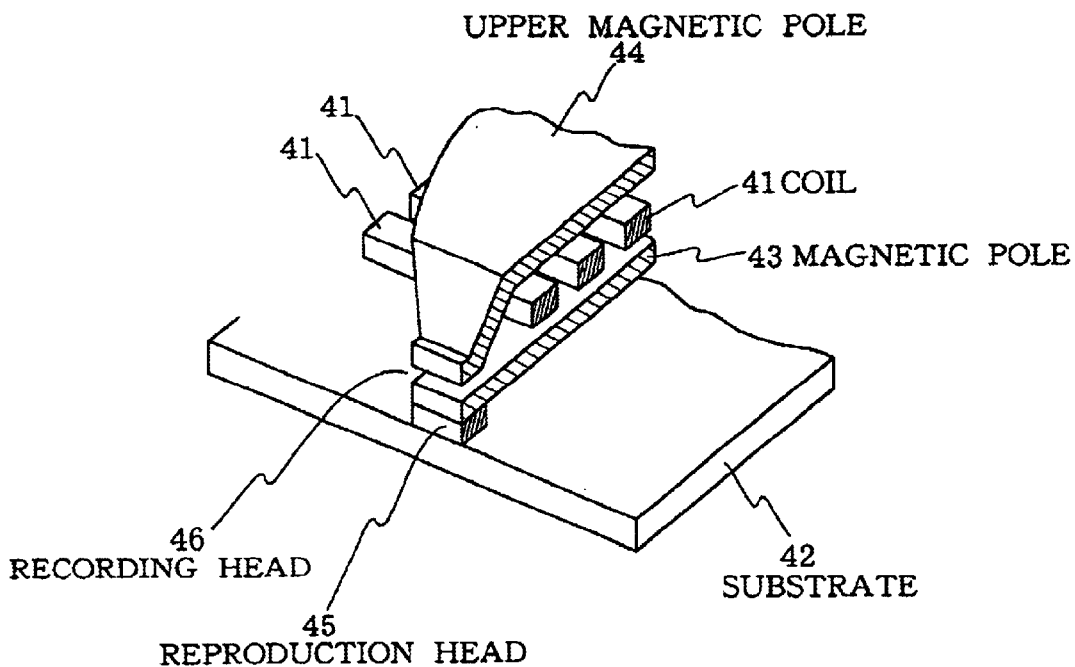
FIG. 32A is a conceptual view of a recording/reproduction head using an MR head produced according to the present invention.

FIG. 32A is a conceptual view of the recording/reproduction head using the MR head produced according to the present invention. The recording/reproduction head includes a reproduction head 45 formed on a substrate 42 a recording head 46 having a magnetic pole 43, a coil 41, and an upper magnetic pole 44. Here, the upper shield film and the lower magnetic film may be formed as a single member or separate members. This recording/reproduction head writes a signal onto a recording medium and reads a signal from a recording medium. As shown in the figure, a detection portion of the reproduction head 45 and a magnetic gap of the recording head 46 are superimposed on a slider and accordingly, they can be positioned simultaneously on a track. This recording/reproduction head is processed into a slider, which is mounted on a magnetic recording/reproduction apparatus.

Figure 32B:
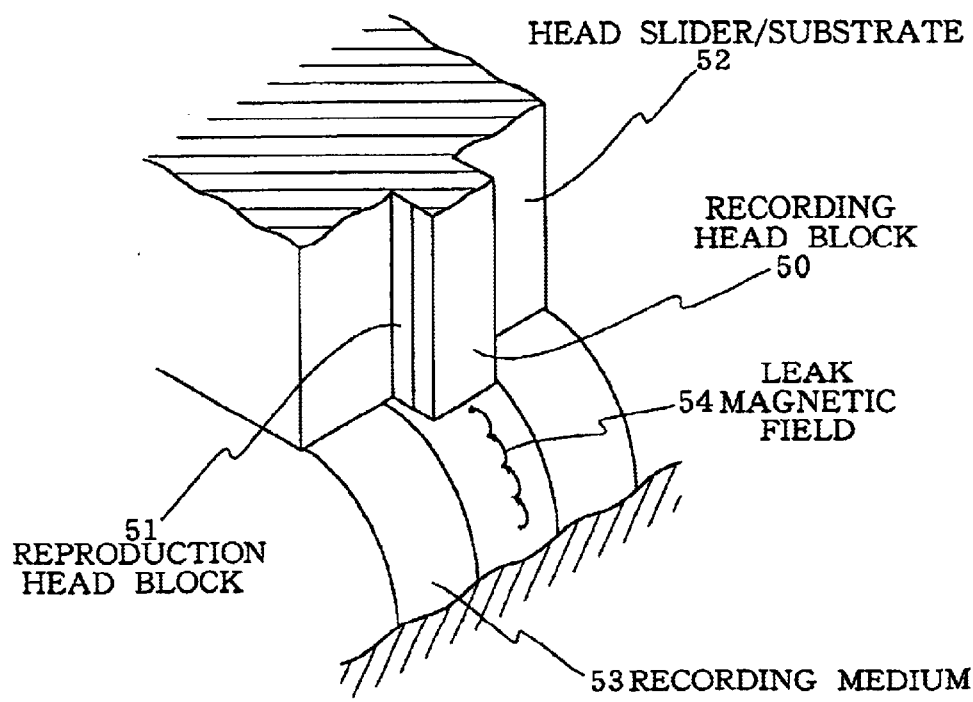
FIG. 32B is a conceptual view of a magnetic recording/reproduction apparatus using the MR head produced according to the present invention.

FIG. 32B is a conceptual view of the magnetic recording/reproduction apparatus using the MR head produced according to the present invention. A reproduction head 51 and a recording head 50 are formed on a substrate 52 also serving as a head slider, and this is positioned on a recording medium 53 for reproduction. The recording medium 53 rotates and the head slider relatively moves over the recording medium 53 at a height of 0.2 micrometers or below or in a contact state with the recording medium 53. With this mechanism, the reproduction head 51 is set at a position to read a magnetic signal recorded on the recording medium 53, from a leak magnetic field 54.

EXAMPLES

We produced an MR head having a configuration shown in FIG. 3, using the method of FIG. 15 to FIG. 18. The MTJ film used consisted of Ta (3 nm), $Ni_{82}Fe_{18}$ (4 nm) $Co_{90}Fe_{10}$ (0.5 nm), Al oxide (1.5 nm), $Co_{90}Fe_{10}$ (2.5 nm), Ru (0.8 nm), $Co_{90}Fe_{10}$ (2 nm), $Pt_{46}Mn_{54}$ (15 nm), Ta (3 nm). Note that the numerals in parentheses indicate film thickness values. After the MTJ film is formed, the film was subjected to a thermal treatment at 250 degrees C. for 5 hours while being subjected to a magnetic field of 500 Oe in a direction vertical to the magnetic field during the film formation. The MTJ film was entirely patterned down to the lowermost Ta layer. The patterning was performed as follows. The MTJ film was subjected to milling in a pure Ar gas atmosphere of 0.3 Pa using a normal milling apparatus. After this, the MTJ film was placed into a plasma oxidation apparatus (asher) for oxidization of the MTJ end surface. The ashing condition was as follows. An RF power of 200 W was applied to an atmosphere of Ar of 0.3 Pa and $O_2$ of 0.1 Pa and the MTJ film end was in contact with a generated plasma for 20 minutes.

The recording/reproduction head was constituted by the following.

1. Substrate . . . altic of 2 mm thickness covered with alumina of 10 micrometers 2. Reproduction head block Lower shield layer . . . $Co_{89}Zr_4Ta_4Cr_3$ (1 micrometer) (the composition is at %)

Lower gap layer . . . alumina (20 nm)

Lower gap thickness regulating layer . . . alumina (40 nm)

Lower electrode layer . . . Ta (1.5 nm)/Pt (80 nm)/Ta (3 nm)

Lower electrode thickness regulating layers . . . Ta (1.5 nm)/Au (40 nm)/Ta (3 nm)

Insulation layer . . . alumina (40 nm)

Longitudinal bias layer . . . Cr (10 nm)/$Co_{74.5}Cr_{10.5}Pt_{15}$ (36 nm)

First upper electrode layer . . . Ta (20 nm)

Second upper electrode layer . . . Ta (1.5 nm)/Au (40 nm)/Ta (3 nm)

Upper electrode thickness regulating layer . . . Ta (1.5 nm)/Au (40 nm)/Ta (3 nm)

Upper gap layer . . . alumina (40 nm)

Upper gap thickness regulating layer . . . alumina (40 nm)

Upper shield layer . . . common to the lower pole of the recording head (common pole)

Boundary control layer . . . none

Overcoat layer . . . none

3. Recording head block

Common pole undercoat . . . $Ni_{82}Fe_{18}$ (90 nm)

Common pole . . . $Ni_{82}Fe_{18}$ (2.5 micrometers)/$Co_{65}Ni_{12}Fe_{23}$ (0.5 micrometers)

Recording gap . . . alumina (0.3 micrometers)

Gap thickness regulating layer . . . alumina (0.7 micrometers)

Coil undercoat . . . Cr (30 nm)/Cu (150 nm)

Coil . . . Cu (4.5 micrometers)

Upper pole undercoat . . . Ti (10 nm)/$Co_{65}Ni_{12}Fe_{23}$ (0.1 micrometers)

Upper pole . . . $Co_{65}Ni_{12}Fe_{23}$ (0.5 micrometers)/$Ni_{82}Fe_{18}$ (3.5 micrometers)

Terminal undercoat . . . Cr (30 nm)/Cu (150 nm)

Terminal . . . Cu (50 micrometers)

Overcoat . . . alumina (52 micrometers)

Gold terminal undercoat . . . Ti (10 nm)/$Ni_{82}Fe_{18}$ (0.1 micrometers)

Gold terminal . . . Au (3 micrometers)

The recording/reproduction head was produced according to a procedure as follows.

1. Producing a reproduction head block
1) Substrate washing
2) Lower shield film formation and anneal
3) Alignment mark formation (PR formation, patterning, and photoresist removal)
4) Patterning of the lower shield (PR formation, taper processing, photoresist removal)
5) Lower gap formation (PR formation, film formation, lift off)
6) Lower gap thickness regulation (PR formation, film formation, lift off)
7) Lower electrode formation (PR formation, film formation, lift off)
8) Lower electrode thickness regulation (PR formation, film formation, lift off)
9) Longitudinal bias film formation (PR formation, film formation, lift off)
10) MTJ element and first upper electrode formation (MTJ film formation, first upper electrode film formation, PR formation, milling down to the upperend of the barrier layer)
11) MTJ film end oxidation by plasma
12) Insulation layer formation (film formation, lift off)
13) Hole formation in the insulation layer and barrier layer (PR formation, milling, PR removal)

Here, we prepared two types: one with two holes 302A and 302B as shown in FIG. 17B (Example 1) and the other with only one hole 302A (Comparative Example 1).

14) Second upper electrode formation (PR formation, film formation, lift off)
15) Pole height monitor formation (PR formation, film formation, lift off)
16) Upper electrode thickness regulation (PR formation, film formation, lift off)
17) Upper gap formation (PR formation, film formation, lift off)
18) Upper gap thickness regulation (PR formation, film formation, lift off)

2. Producing a recording head block
1) Common pole formation (second undercoat film formation, frame PR formation, common pole plating, cover PR formation, chemical etching, undercoat removal)
2) Pole height burying resist
3) Gap film formation
4) Gap thickness regulation (PR formation, film formation, lift off)
5) Formation of a pole for magnetically connecting the upper pole to the common pole (PR formation, milling, PR removal)
6) Formation of coil formation resist 1 for securing insulation of the coil
7) Coil formation (undercoat film formation, PR formation, coil plating, chemical etching, undercoat removal)
8) Formation of resist 2 for securing insulation of the coil
9) Gap regulating milling
10) Upper pole formation (undercoat film formation, frame resist formation, upper pole plating, plate anneal, undercoat removal, cover PR formation, chemical etching, undercoat removal)
11) Terminal formation (undercoat film formation, PR formation, terminal plating, chemical etching, undercoat removal)
12) Overcoat film formation
13) Terminal lapping
14) Gold terminal plating (undercoat film formation, PR formation, gold terminal plating, undercoat removal)

3. Post-processing
1) Cutting into rows
2) ABS processing by lapping
3) Covering the ABS with DLC film
4) Processing into slider
5) Mounting on a suspension Using this recording/reproduction head, a data was recorded and reproduced onto/from a CoCrTa medium. The write track width was 3 micrometers, the write gap was 0.2 micrometers, and the read track width was 2 micrometers. The photoresist during a production of the coil of the write head block was hardened at 250 degrees C. for 2 hours. In this step, the magnetization direction of the pinned layer and the pinning layer, which should be in the element height direction, was rotated and did not operate correctly as an MR element. For this, after the reproduction head block and the recording head block were prepared, they were subjected to magnetization thermal processing at 200 degrees C. and the magnetic field of 500 Oe for 1 hour. Almost no rotation of the magnetization axis of the free layer by this magnetization thermal processing was observed in the magnetization curve. During the hole formation in the insulation layer and the barrier layer, we prepared 10 samples in which two holes 302A and 302B were formed (Example 1) in FIG. 17B and 10 and 10 samples in which only 302A was formed (Comparative Example 1) using the same production procedure. The coercive force of the medium was set to 5.0 kOe, and MrT was set to 0.35 m emu/cm². Using the recording/reproduction head produced, we measured reproduction output. FIGS. 33A and 33B show the reproduction output measurement results of the respective heads.

As shown in FIG. 33A, among the Comparative Example1, only twosamples out of ten exhibited a large output of 3 mV or above. On the contrary, as shown in FIG. 33B, in the Example 1, eight samples out of ten exhibited a large output of 3 MV or above, significantly increasing the yield. The reason is as follows. When a hole is formed also at the position of 302B in FIG. 17B, the upper electrode and the lower electrode are at identical potential in the step of the upper electrode film formation and after. Accordingly, the pinned layer and the free layer in the MTJ film are at identical potential, which protects the barrier layer from electrostatic destruction until the position of 302B is removed in the lapping step. Thus, we could obtain a high yield.

Next, by using the method of FIG. 19 and FIG. 20, we produced an MR head having the structure of FIG. 3. The production procedure of The MTJ film, components of the recording/reproduction head, and the recording head and the post-processing are identical to the ones produced by using the method of FIG. 15 to FIG. 18 and their explanation is omitted.

The reproduction head was produced as follows.
1) Substrate washing
2) Lower shield film formation and anneal
3) Alignment mark formation (PR formation, patterning, resist removal)
4) Lower shield patterning (PR formation, taper processing, resist removal)
5) Lower gap formation (PR formation, film formation, lift off)
6) Lower gap thickness regulation (PR formation, film formation, lift off)
7) Lower electrode formation (PR formation, film formation, lift off)
8) Lower electrode thickness regulation (PR formation, film formation, lift off)
9) Longitudinal bias film formation (PR formation, film formation, lift off)
10) MTJ element and first upper electrode formation (MTJ film formation, first upper electrode film formation, PR formation, milling down to the upper end of the barrier layer)
11) MTJ film end portion oxidization by plasma
12) Insulation layer formation (film formation, lift off)
13) Short-circuiting of the free layer with the pinned layer in the MTJ block (PR formation, milling down to the undercoat layer, conductive layer formation, PR removal)
14) Hole formation in the insulation layer and the barrier layer (PR formation, milling, PR removal)
15) Second upper electrode formation (PR formation, film formation, lift off)
16) Pole height monitor formation (PR formation, film formation, lift off)
17) Upper electrode thickness regulation (PR formation, film formation, lift off)
18) Upper gap formation (PR formation, film formation, lift off)
19) Upper gap thickness regulation (PR formation, film formation, lift off)

By using this recording/reproduction head, a data was recorded onto and reproduced from a CoCrTa medium. The write track width was 3 micrometers, the write gap was 0.2 micrometers, and the read track width was 2 micrometers. The photoresist during a production of the coil of the write head block was hardened at 250 degrees C. for 2 hours. In this step, the magnetization direction of the pinned layer and the pinning layer, which should be in the element height direction, was rotated and did not operate correctly as an MR element. For this, after the reproduction head block and the recording head block were prepared, they were subjected to magnetization thermal processing at 200 degrees C. and the magnetic field of 500 Oe for 1 hour. Almost no rotation of the magnetization axis of the free layer by this magnetization thermal processing was observed in the magnetization curve. Using the same production procedure for identical structure, we prepared 10 samples of recording/reproduction head (Example 2) The coercive force of the medium was set to 5.0 kOe, and MrT was set to 0.35 m emu/cm². Using the recording/reproduction head produced, we measured reproduction output. FIG. 33C shows the reproduction output measurement results of the ten heads.

As shown in FIG. 33C, in the Example 2, nine samples out of ten exhibited a large output of 3 mV or above, significantly increasing the yield. The reason is as follows. By introducing a step for the pinned layer to be brought into an electric contact with the free layer, the upper electrode and the lower electrode are at identical potential in the steps after this. Accordingly, the pinned layer and the free layer in the MTJ film are at identical potential, which protects the barrier layer from electrostatic destruction until the pinned layer is electrically disconnected from the free layer in the lapping step. Thus, we could obtain a high yield.

Next, we produced the MR head having the structure of FIG. 5. The MTJ film consisted of Ta (3 nm), $Pt_{46}Mn_{54}$ (15 nm), $Co_{90}Fe_{10}$ (2 nm), Ru (0.8 nm), $Co_{90}Fe_{10}$ (2 nm), Al oxide (1.5 nm), $Co_{90}Fe_{10}$ (0.5 nm), $Ni_{82}Fe_{18}$ (4 nm), Ta (3 nm). After the film formation, the film was subjected to a thermal processing at 250 degrees C. for 5 hours while being subjected to a magnetic field of 500 Oe in the direction orthogonally intersecting the magnetic field during film formation. In the MTJ patterning, the MTJ film was patterned down to the lowermost Ta layer. The MTJ film was patterned by using a normal milling apparatus and the milling was performed in a pure Ar gas atmosphere of 0.3 Pa. After this, the MTJ film was placed in a plasma oxidization apparatus (asher) for oxidization of the MTJ film end surface. The ashing was performed by applying an RF power of 200 W to an atmosphere of 0.3 Pa Ar and 0.1 Pa $O_2$, so as to generate plasma with which the MTJ end surface was in contact for 20 minutes.

The recording/reproduction head was constituted by the following.

1. Substrate . . . altic of 2 mm thickness covered with alumina of 10 micrometers 2. Reproduction head block Lower shield layer . . . $Co_{89}Zr_4Ta_4Cr_3$ (1 micrometer) (the composition is at %)

Lower gap layer . . . alumina (20 nm)

Lower gap thickness regulating layer . . . alumina (40 nm)

Lower electrode layer . . . Ta (1.5 nm)/Pt (80 nm)/Ta (3 nm)

Lower electrode thickness regulating layer . . . Ta (1.5 nm)/Au (40 nm)/Ta (3 nm)

Insulation layer . . . alumina (40 nm)

Longitudinal bias layer . . . Cr (10 nm)/$Co_{74.5}Cr_{10.5}Pt_{15}$ (36 nm)

First upper electrode layer . . . Ta (20 nm)

Second upper electrode layer . . . Ta (1.5 nm)/Au (40 nm)/Ta (3 nm)

Upper electrode thickness regulating layer . . . Ta (1.5 nm)/Au (40 nm)/Ta (3 nm)

Upper gap layer . . . alumina (40 nm)

Upper gap thickness regulating layer . . . alumina (40 nm)

Upper shield layer . . . common to the lower pole of the recording head (common pole)

Boundary control layer . . . none

Overcoat layer . . . none

3. Recording head block

Common pole undercoat . . . $Ni_{82}Fe_{18}$ (90 nm)

Common pole . . . $Ni_{82}Fe_{18}$ (2.5 micrometers)/$Co_{65}Ni_{12}Fe_{23}$ (0.5 micrometers)

Recording gap . . . alumina (0.3 micrometers)

Gap thickness regulating layer . . . alumina (0.7 micrometers)

Coil undercoat . . . Cr (30 nm)/Cu (150 nm)

Coil . . . Cu (4.5 micrometers)

Upper pole undercoat . . . Ti (10 nm)/$Co_{65}Ni_{12}Fe_{23}$ (0.1 micrometers)

Upper pole . . . $Co_{65}Ni_{12}Fe_{23}$ (0.5 micrometers)/$Ni_{82}Fe_{18}$ (3.5 micrometers)

Terminal undercoat . . . Cr (30 nm)/Cu (150 nm)

Terminal . . . Cu (50 micrometers)

Overcoat . . . alumina (52 micrometers)

Gold terminal undercoat . . . Ti (10 nm)/$Ni_{82}Fe_{18}$ (0.1 micrometers)

Gold terminal . . . Au (3 micrometers)

The recording/reproduction head was produced according to a procedure as follows.

1. Producing a reproduction head block
1) Substrate washing
2) Lower shield film formation and anneal
3) Alignment mark formation (PR formation, patterning, and photoresist removal)
4) Patterning of the lower shield (PR formation, taper processing, photoresist removal)
5) Lower gap formation (PR formation, film formation, lift off)
6) Lower gap thickness regulation (PR formation, film formation, lift off)
7) Lower electrode formation (PR formation, film formation, lift off)
8) Lower electrode thickness regulation (PR formation, film formation, lift off)
9) MTJ element and first upper electrode formation (MTJ film formation, first upper electrode film formation, PR formation, milling down to the upperend of the barrier layer)
10) MTJ film end oxidation by plasma
11) Longitudinal bias film formation
12) Insulation layer formation
13) Lift off
14) Longitudinal bias layer patterning (PR formation, milling (leaving the insulation layer), PR removal)
15) Hole formation in the insulation layer and barrier layer (PR formation, milling, PR removal)

Here, we prepared two types: one with two holes 502A and 502B as shown in FIG. 25A (Example 3 ) and the other with only one hole 502A (Comparative Example 2).

16) Second upper electrode formation (PR formation, film formation, lift off)
17) Pole height monitor formation (PR formation, film formation, lift off)
18) Upper electrode thickness regulation (PR formation, film formation, lift off)
19) Upper gap formation (PR formation, film formation, lift off)
20) Upper gap thickness regulation (PR formation, film formation, lift off)

2. Producing a recording head block
1) Common pole formation (second undercoat film formation, frame PR formation, common pole plating, cover PR formation, chemical etching, undercoat removal)
2) Pole height burying resist
3) Gap film formation
4) Gap thickness regulation (PR formation, film formation, lift off)
5) Formation of a pole for magnetically connecting the upper pole to the common pole (PR formation, milling, PR removal)
6) Formation of coil formation resist 1 for securing insulation of the coil
7) Coil formation (undercoat film formation, PR formation, coil plating, chemical etching, undercoat removal)

8) Formation of resist 2 for securing insulation of the coil
9) Gap regulating milling
10) Upper pole formation (undercoat film formation, frame resist formation, upper pole plating, plate anneal, undercoat removal, cover PR formation, chemical etching, undercoat removal)
11) Terminal formation (undercoat film formation, PR formation, terminal plating, chemical etching, undercoat removal)
12) Overcoat film formation
13) Terminal lapping
14) Gold terminal plating (undercoat film formation, PR formation, gold terminal plating, undercoat removal)

3. Post-processing
1) Cutting into rows
2) ABS processing by lapping
3) Covering the ABS with DLC film
4) Processing into slider
5) Mounting on a suspension Using this recording/reproduction head, a data was recorded onto and reproduced from a CoCrTa medium. The write track width was 3 micrometers, the write gap was 0.2 micrometers, and the read track width was 2 micrometers. The photoresist during a production of the coil of the write head block was hardened at 250 degrees C. for 2 hours. In this step, the magnetization direction of the pinned layer and the pinning layer, which should be in the element height direction, was rotated and did not operate correctly as an MR element. For this, after the reproduction head block and the recording head block were prepared, they were subjected to magnetization thermal processing at 200 degrees C. and the magnetic field of 500 Oe for 1 hour. Almost no rotation of the magnetization axis of the free layer by this magnetization thermal processing was observed in the magnetization curve. During the hole formation in the insulation layer and the barrier layer, we prepared 10 samples in which two holes 502A and 502B in FIG. 25A were formed (Example 3) and 10 samples in which only 502A was formed (Comparative Example 2) using the same production procedure. The coercive force of the medium was set to 5.0 kOe, and MrT was set to 0.35 m emu/cm$^2$.

Using the recording/reproduction head produced, we measured reproduction output. FIGS. 34A and 34B show the reproduction output measurement results of the respective heads. As shown in FIG. 34A, among the Comparative Example 2, only three samples out of ten samples exhibited a large output of 3 mV or above. On the contrary, in the Example 3, eight samples out of ten exhibited a large output of 3 mV or above, significantly increasing the yield. When a hole is formed also at the position of 502B in FIG. 25A, the upper electrode and the lower electrode are at identical potential in the step of the upper electrode film formation and after. Accordingly, the pinned layer and the free layer in the MTJ film are at identical potential, which protects the barrier layer from electrostatic destruction until the position of 502B is removed in the lapping step. Thus, we could obtain a high yield.

Next, by using the method of FIG. 27 and FIG. 28, we produced an MR head having the structure of FIG. 5. The production procedure of The MTJ film, components of the recording/reproduction head, and the recording head and the post-processing are identical to the ones produced by using the method of FIG. 23 to FIG. 26 and their explanation is omitted.

The reproduction head was produced as follows.
1) Substrate washing
2) Lower shield film formation and anneal
3) Alignment mark formation (PR formation, patterning, resist removal)
4) Lower shield patterning (PR formation, taper processing, resist removal)
5) Lower gap formation (PR formation, film formation, lift off)
6) Lower gap thickness regulation (PR formation, film formation, lift off)
7) Lower electrode formation (PR formation, film formation, lift off)
8) Lower electrode thickness regulation (PR formation, film formation, lift off)
9) MTJ element and first upper electrode formation (MTJ film formation, first upper electrode film formation, PR formation, milling down to the upper end of the barrier layer)
10) MTJ film end portion oxidization by plasma
11) Insulation layer formation
12) Longitudinal bias layer film formation
13) Lift off
14) Longitudinal bias layer patterning (PR formation, milling (leaving the insulation layer), PR removal)
15) Short-circuiting of the free layer with the pinned layer in the MTJ block (PR formation, milling down to the undercoat layer, conductive layer formation, PR removal)
16) Hole formation in the insulation layer and the barrier layer (PR formation, milling, PR removal)
17) Second upper electrode formation (PR formation, film formation, lift off)
18) Pole height monitor formation (PR formation, film formation, lift off)
19) Upper electrode thickness regulation (PR formation, film formation, lift off)
20) Upper gap formation (PR formation, film formation, lift off)
21) Upper gap thickness regulation (PR formation, film formation, lift off)

By using this recording/reproduction head, a data was recorded and reproduced onto/from a CoCrTa medium. The write track width was 3 micrometers, the write gap was 0.2 micrometers, and the read track width was 2 micrometers. The photoresist during a production of the coil of the write head block was hardened at 250 degrees C. for 2 hours. In this step, the magnetization direction of the pinned layer and the pinning layer, which should be in the element height direction, was rotated and did not operate correctly as an MR element. For this, after the reproduction head block and the recording head block were prepared, they were subjected to magnetization thermal processing at 200 degrees C. and the magnetic field of 500 Oe for 1 hour. Almost no rotation of the magnetization axis of the free layer by this magnetization thermal processing was observed in the magnetization curve. Using the same production procedure for identical structure, we prepared 10 samples of recording/reproduction head (Example 4) The coercive force of the medium was set to 5.0 kOe, and MrT was set to 0.35 m emu/cm$^2$. Using the recording/reproduction head produced, we measured reproduction output. FIG. 34C shows the reproduction output measurement results of the ten heads.

As shown in FIG. 34C, in the Example 4, nine samples out of ten exhibited a large output of 3 mV or above, significantly increasing the yield. The reason is as follows. By introducing a step for the pinned layer to be brought into an electric contact with the free layer, the upper electrode and the lower electrode are at identical potential in the steps after this. Accordingly, the pinned layer and the free layer in the MTJ film are at identical potential, which protects the barrier layer from electrostatic destruction until the pinned layer is electrically disconnected from the free layer in the lapping step. Thus, we could obtain a high yield.

Next, we produced the MR head having the structure of FIG. 3. The MTJ film, the components constituting the recording/reproduction head, the reproduction head producing procedure, the recording head producing procedure, and the post-processing are identical to the one produced by using the method of FIG. 15 to FIG. 18, and their explanations are omitted.

Using this MR head, a data was recorded and reproduced onto/from a CoCrTa medium. The write track width was 3 micrometers, the write gap was 0.2 micrometers, and the read track width was 2 micrometers. The photoresist during a production of the coil of the write head block was hardened at 250 degrees C. for 2 hours. In this step, the magnetization direction of the pinned layer and the pinning layer, which should be in the element height direction, was rotated and did not operate correctly as an MR element. For this, after the reproduction head block and the recording head block were prepared, they were subjected to magnetization thermal processing at 200 degrees C. and the magnetic field of 500 Oe for 1 hour. Almost no rotation of the magnetization axis of the free layer by this magnetization thermal processing was observed in the magnetization curve. With the same production procedure, we prepared 10 samples having the pinned layer/barrier layer/free layer (MTJ junction) area before lapping is 5 times greater than the MTJ junction area after lapping (Comparative Example 3); and 10 samples having the pinned layer/barrier layer/free layer (MTJ junction) area before lapping is 100 times greater than the MTJ junction area after lapping (Example 5). The coercive force of the medium was set to 5.0 kOe, and MrT was set to 0.35 m emu/cm$^2$. Using the recording/reproduction head produced, we measured reproduction output. FIGS. 35A and 35B show the reproduction output measurement results of the respective MR heads.

As shown in FIG. 35A, among the Comparative Example 3, only three samples out of ten exhibited a large output of 3 mV or above. On the contrary, as shown in FIG. 35B, in the Example 5, seven samples out of ten exhibited a large output of 3 mV or above, significantly increasing the yield. In Example 5, the MTJ junction area before the ABS lapping was 100 times greater than the area after the lapping and accordingly, it is considered that it was possible to prevent element destruction due to ESD during production, thus increasing the yield.

Next, explanation will be given on a magnetic disc apparatus using the MR head produced according to the present invention. The magnetic disc apparatus includes three magnetic discs on a base having on its back surface a head drive circuit, a signal processing circuit, and an I/O interface. The magnetic disc apparatus is connected with outside via a 32-bit bus line. A total of six heads are arranged for the both surfaces of the three magnetic discs. The magnetic disc apparatus includes a rotary actuator for driving the heads, and its drive and control circuit, and a spindle motor for disc rotation. The disc has a diameter of 46 mm and a data surface from 10 mm to 40 mm. Since a buried servo type is used having no servo surface, it is possible to obtain a high density. This magnetic disc apparatus can directly be connected as an external storage apparatus of a small size computer. The I/O interface includes a cache memory so as to correspond to the bus line having a transfer speed of 5 to 20 megabytes per second. Moreover, it is possible to connect a plurality of the magnetic disc apparatuses by using an external controller so as to constitute a large-capacity magnetic disc apparatus.

According to the MR head production method according to the present invention, at the step where a resistance value between the free layer and the pinned layer is set smaller than a resistance value when used as an MR head and at the steps after this, current can easily flow between the free layer and the pinned layer, preventing a high voltage from being applied to the barrier layer. Accordingly, it is possible to prevent an insulation destruction of the barrier layer during a production process. Moreover, at the step where the resistance value between the free layer and the pinned layer is increased to a resistance value when used as an MR head and at the steps after this, the free layer, the barrier layer, and the pinned layer can be functioned as a tunnel junction film. Accordingly, it is possible to increase the MR head production yield.

Moreover, according to the MR head production method of the present invention, at the step where the free layer is electrically connected to the pinned layer and at the steps after this, the free layer and the pinned layer are at the same potential and accordingly no high voltage is applied to the barrier layer, thus preventing the insulation destruction of the barrier layer during a production process. Moreover, at the step where the free layer is electrically disconnected from the pinned layer and at the steps after this, the free layer, the barrier layer, and the pinned layer can be functioned as a tunnel junction film. Accordingly, it is possible to increase the MR head production yield.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-129684 (Filed on May 11$^{th}$, 1999) and Japanese Patent Application No. 11-272516 (Filed on Sep. 27$^{th}$, 1999) including specification, claims, drawings and summary are incorporated herein by reference in its entirety.

What is claimed is:

1. In a production process for producing a magnetoresistive (MR) head having a tunnel junction film having a free layer, a barrier layer, and a pinned layer, the improvement comprising the steps of:
    a first step of forming a production resistance value during the production process of the MR head between the free layer and the pinned layer smaller than a MR head resistance value when used as the MR head; and
    a second step of increasing the production resistance value formed in the first step during the production process of the MR head, to the MR head resistance value when used as the MR head.

2. In a method as claimed in claim 1, the improvement wherein the second step includes a step of disconnecting the free layer from the pinned layer by lapping the free layer.

3. In a method as claimed in claim 1, the improvement wherein the first step electrically connects an upper electrode layer to a lower electrode layer and the second step includes a step of disconnecting the free layer from the pinned layer by lapping the free layer.

4. In a method as claimed in claim 1, the improvement wherein the first step includes a step of connecting the free layer to the pinned layer by a conductive member and the second step includes a step of completely removing the conductive member by lapping the conductive member.

5. In a method as claimed in claim 1, the improvement wherein the first step includes a step of exposing a portion of the free layer and the pinned layer, and adhering a conductive body to the portion of the free layer and the pinned layer, and the second step includes a step of completely removing the conductive body by lapping the conductive body.

6. In a method as claimed in claim 1, the improvement wherein the first step includes a step of making the tunnel junction film area larger than when used as the MR head; and the second step includes a step of lapping so that the tunnel junction film area is equal to the area when used as the MR head.

7. In a production process for producing an MR head having a lower shield layer formed on a substrate; a lower electrode layer formed on the lower shield layer or shared with the lower shield layer; a longitudinal bias layer formed at two positions on the lower electrode layer viewed from an ABS; a free layer formed on the longitudinal bias layer and the lower electrode layer; a barrier layer formed on the free layer; a tunnel junction film having the free layer, the barrier layer, a pinned layer, and a pinning layer successively formed in this order on the barrier layer where the longitudinal bias layer is not formed; a first upper electrode layer formed on the pinning layer; an insulation layer formed on the barrier layer where the longitudinal bias layer is formed; a second upper electrode layer formed on the insulation layer and the first upper electrode layer; and an upper shield layer formed on the second upper electrode layer or shared with the second upper electrode layer; the improvement comprising the steps of:

a first step of forming a production resistance value during the production process of the MR head, between the free layer and the pinned layer smaller than a MR head resistance value when used as the MR head; and a second step of increasing the production resistance value formed in the first step during the production process of the MR head, to the MR head resistance value when used as the MR head.

8. In a method as claimed in claim 7, the improvement wherein the second step includes a step of disconnecting the free layer from the pinned layer by completely lapping the ABS.

9. In a method as claimed in claim 7, the improvement wherein the first step electrically connects the first upper electrode layer to the lower electrode layer and the second step includes a step of disconnecting the free layer from the pinned layer by completely lapping the ABS.

10. In a method as claimed in claim 7, the improvement wherein the first step includes a step of connecting the free layer to the pinned layer by a conductive member and the second step includes a step of completely removing the conductive member by lapping the conductive member.

11. In a method as claimed in claim 7, the improvement wherein the first step includes a step of exposing a portion of the free layer and the pinned layer, and adhering a conductive body to the portion of the free layer and the pinned layer, and the second step includes a step of completely removing the conductive body by lapping the conductive body.

12. In a method as claimed in claim 7, the improvement wherein the first step includes a step of making the tunnel junction film area larger than when used as the MR head; and the second step includes a step of lapping the ABS so that the tunnel junction film area is equal to the area when used as the MR head.

* * * * *